(12) United States Patent
Takahashi

(10) Patent No.: US 11,392,270 B2
(45) Date of Patent: Jul. 19, 2022

(54) CHANGING OPERATION ASSISTING APPARATUS

(71) Applicant: TOYOTA JIDOSHA KABUSHIKI KAISHA, Toyota (JP)

(72) Inventor: Yoshihiko Takahashi, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 315 days.

(21) Appl. No.: 16/686,875

(22) Filed: Nov. 18, 2019

(65) Prior Publication Data
US 2020/0167045 A1 May 28, 2020

(30) Foreign Application Priority Data
Nov. 22, 2018 (JP) .............................. JP2018-219588

(51) Int. Cl.
| | | |
|---|---|---|
| *G06F 3/0482* | (2013.01) | |
| *B60W 30/14* | (2006.01) | |
| *B60W 30/08* | (2012.01) | |
| *B60W 50/14* | (2020.01) | |
| *B60Q 9/00* | (2006.01) | |

(52) U.S. Cl.
CPC .......... *G06F 3/0482* (2013.01); *B60Q 9/008* (2013.01); *B60W 30/08* (2013.01); *B60W 30/14* (2013.01); *B60W 50/14* (2013.01); *B60W 2050/146* (2013.01)

(58) Field of Classification Search
CPC ... G06F 3/0482; G06F 3/04847; B60Q 9/008; B60W 30/08; B60W 30/14; B60W 50/14; B60W 2050/146; B60K 2370/162; B60K 2370/172; B60K 2370/175; B60K 2370/1868; B60K 2370/191; B60K 2370/736; B60K 35/00; B60K 37/06
See application file for complete search history.

(56) References Cited

U.S. PATENT DOCUMENTS

| | | | |
|---|---|---|---|
| 2019/0031187 A1* | 1/2019 | Noguerol | ............ B60W 50/085 |
| 2019/0163288 A1* | 5/2019 | You | ........................ G06F 3/0362 |

FOREIGN PATENT DOCUMENTS

| | | |
|---|---|---|
| JP | 2003-266860 A | 9/2003 |
| JP | 2007-317223 A | 12/2007 |
| JP | 2010-038620 A | 2/2010 |
| JP | 2016-070806 A | 5/2016 |
| JP | 2016-101659 A | 6/2016 |

\* cited by examiner

*Primary Examiner* — Jeff A Burke
*Assistant Examiner* — Sihar A Karwan
(74) *Attorney, Agent, or Firm* — Sughrue Mion, PLLC

(57) ABSTRACT

A display of a changing operation assisting apparatus for a vehicle selectively displays various screens which include setting elements and transition elements. Each of the setting elements is previously related to a setting item relating to a driving assistance function provided by the vehicle. Each of the transition elements is previously related to a different one of the screens. If a set state corresponding to one of the elements has changed within a setting change determination period, the apparatus increases a state change value corresponding to a combination of a driver who is currently on the vehicle and the element. The apparatus displays, as a part of a specific screen, the element whose increase amount of the state change value corresponding the driver within a display determination period is equal to or greater than a threshold.

10 Claims, 16 Drawing Sheets

FIG.4

| | DRIVE ASSISTANCE FUNCTION | SETTING ELEMENT | HIGHWAY | PARKING |
|---|---|---|---|---|
| 1 | PRE-CRUSH SAFETY | | | |
| 2 | LANE TRACING ASSIST | ○ | ○ | |
| 3 | ROAD SIGN ASSIST | ○ | | |
| 4 | RADAR CRUISE CONTROL | | ○ | |
| 5 | PRECEDING VEHICLE START NOTIFICATION | | | |
| 6 | BLIND SPOT MONITORING | ○ | ○ | |
| 7 | CLEARANCE SONAR | ○ | | ○ |
| 8 | REAR CROSS TRAFFIC ALARM | ○ | | ○ |
| 9 | PARKING SUPPORT BRAKE | ○ | | ○ |
| | | ↑ Cm1 | ↑ Cm2 | ↑ Cm3 |

FIG.14

| Day / Function | 10 | 9 | 8 | 7 | 6 | 5 | 4 | 3 | 2 | 1 | Today | Display value increase amount Ad |
|---|---|---|---|---|---|---|---|---|---|---|---|---|
| 1 Pre-Crush Safety | 1 | 0 | 0 | 0 | 0 | 0 | 0 | 0 | 0 | 0 | 0 | 0 |
| 2 Lane Tracing Assist | 0 | 0 | 1 | 0 | 0 | 1 | 0 | 1 | 0 | 0 | 0 | 3 |
| 3 Road Sign Assist | 0 | 0 | 0 | 0 | 0 | 0 | 0 | 0 | 0 | 0 | 0 | 0 |
| 4 Radar Cruise Control | 0 | 1 | 1 | 0 | 0 | 0 | 1 | 0 | 0 | 2 | 0 | 4 |
| 5 Preceding Vehicle Start Notification | 0 | 0 | 1 | 0 | 2 | 0 | 1 | 0 | 0 | 0 | 1 | 5 |
| 6 Blind Spot Monitoring | 0 | 0 | 0 | 0 | 0 | 0 | 0 | 0 | 0 | 0 | 0 | 0 |
| 7 Clearance Sonar | 0 | 0 | 0 | 0 | 0 | 0 | 1 | 0 | 0 | 0 | 0 | 1 |
| 8 Rear Cross Traffic Alarm | 1 | 0 | 0 | 0 | 0 | 0 | 0 | 0 | 0 | 0 | 0 | 0 |
| 9 Parking Support Brake | 0 | 0 | 0 | 0 | 1 | 0 | 0 | 0 | 0 | 0 | 0 | 1 |
| Existence or Non-Existence of Driving by the Driver on board | ○ | ○ | ○ | | ○ | ○ | ○ | ○ | | ○ | ○ | Rw1 |

Increase amounts of the State Change Value Sc per day

Display determination period Pd

CHANGING OPERATION ASSISTING APPARATUS

BACKGROUND OF THE DISCLOSURE

Field of the Disclosure

The present disclosure relates to a changing operation assisting apparatus (assist apparatus for changing operation) which facilitates changing of the set states of driving assistance functions provided by a vehicle.

Description of the Related Art

There has been known a vehicle which provides driving assistance functions for assisting a driver to drive the vehicle. Examples of the driving assistance functions include a lane tracing assist (lane keeping control) function, an adaptive cruise control (ACC) function, and a preceding vehicle starting notification function.

A driving assistance system of such a vehicle is configured to allow a driver to activate or stop some driving assistance functions. Further, the driving assistance system is configured to allow the driver to set or change control parameters necessary for performing some driving assistance functions (for example, a control parameter to determine a target inter-vehicular distance for the ACC function). Hereinafter, control parameters for determine whether to bring respective driving assistance functions into an inactivated or an activated state and control parameters of driving assistance functions which can be changed by the driver will be collectively referred to as "setting items" of the driving assistance functions.

In many cases, in order to change the set states of setting items relating to the driving assistance functions, a display apparatus and an operation section are used. The display apparatus displays a screen including various display elements. The driver selects one of the displayed display elements by using the operation section. The display elements include an element related to a particular setting item (hereinafter also referred to as a "setting element") and an element for transition to a particular screen (hereinafter also referred to as a "transition element"). The transition element is selected to change screens from the current screen to the particular screen.

In general, various screens selectively displayed on the display apparatus have a hierarchic (multi-level) structure in which a top screen (top page) is located at the top. When the driver wants to change the set state of a driving assistance function, the driver selects a corresponding transition element by operating the operation section so as to switch the screen displayed on the display apparatus (for screen transition), thereby displaying a screen (setting screen) including a desired setting element. Subsequently, the driver changes the set state of the driving assistance function by selecting the desired setting element displayed. Therefore, in a case where the number of the driving assistance functions is large or a case where each driving assistance function has a large number of setting items, the number of screens selectively displayed on the display apparatus are quite large. As a result, the operation necessary to change the set states of the driving assistance functions are complicated.

In view of the foregoing, one of conventional changing operation assisting apparatuses (hereinafter also referred to as the "conventional apparatus") preferentially displays a display element (namely, transition element) for transition to a screen (referred to as a preferential screen) that has been frequently displayed (see, for example, Japanese Patent Application Laid-Open (kokai) No. 2003-266860).

For example, the expression "preferentially displays a display element" means to display that display element in a prominent (appreciable) manner on a screen whose level in the hierarchic structure is higher than that of the preferential screen. Hereinafter, the preferentially displayed display element will also be referred to as the "preferentially displayed element." This allows a user (the driver) to simply select the preferentially displayed element in order to display the screen containing the desired setting element. Therefore, the user can easily change the desired set state.

SUMMARY OF THE DISCLOSURE

Incidentally, in some cases, in order to check the procedure of changing the set state of a certain setting item corresponding to a certain driving assistance function, a driver of a vehicle changes the set state once and returns the set state to the original state within a relatively short period of time. For example, in a case where the driver wants to check the procedure for stopping the operation of a certain driving assistance function, the driver displays a setting screen including a setting element for stopping the operation of that driving assistance function, and selects that setting element, thereby temporarily stopping the operation of that driving assistance function.

As a result, a display element indicating the stoppage of that driving assistance function is displayed on the display apparatus. From this, the driver learns that he or she can stop the operation of that driving assistance function by the above-described operation. Subsequently, the driver resumes the operation of that driving assistance function. Hereinafter, the operation of changing a set state temporarily and returning it to the original state in order to check the procedure of changing the set state will also be referred to as "setting procedure checking operation."

However, the conventional apparatus determines the priority of each display element without taking into consideration of whether or not an operation performed by a user is the above-mentioned setting procedure checking operation and determines a preferentially displayed element on the basis of the priority. Therefore, there arises a possibility that a display element whose priority has become higher as a result of the setting procedure checking operation is selected as a preferentially displayed element and a display element to be preferably displayed as a preferentially displayed element is not selected as a preferentially displayed element.

The present disclosure has been accomplished so as to solve the above-described problem. One object of the present disclosure is to provide a changing operation assisting apparatus configured such that, even when the above-described setting procedure checking operation is performed, the changing operation assisting apparatus accurately selects, as a preferentially displayed element, a display element relating to a driving assistance function whose set state a driver of a vehicle wants to change.

A changing operation assisting apparatus for achieving the above-described object (hereinafter also referred to as the "apparatus of the present disclosure") comprises a display section, an operation section, and a control section. The control section may be implemented by at least one programmed processor whose operation is determined by a predetermined program, gate arrays and the like.

The display section (a display 27) is disposed in a vehicle (10) and configured to be capable of displaying various screens.

The screens include, as "selection elements," "display elements" which include "setting elements" and "transition elements."

Each of the setting elements is the selection element which has been related to a setting item relating to a driving assistance function provided by the vehicle in advance and is selected so as to change a set state of the setting item, Each of the transition elements is the selection element which has been related to a different one of the screens in advance and is selected for displaying the different one of the screens through screen transition.

The operation section (a selection switch 56 and an OK switch 57) is used by a driver of the vehicle for an operation of selecting one of the selection elements contained in the screen displayed on the display section and is configured to be capable of outputting information regarding the operation of selecting.

The control section (a driving assistance ECU 20) is configured to control the screens selectively displayed on the display section and change the set state relating to the driving assistance function on the basis of the information regarding the operation of selecting output from the operation section.

The control section includes a driver specifying section, a state change value processing section, and a preferentially displayed element display section.

The driver specifying section specifies a driver who is currently on (sitting in) the vehicle.

The state change value processing section is configured to increase a state change value (Sc) corresponding to a combination of the specified driver and a specific element among the selection elements (step 1520 of FIG. 15), if a set state of a specific setting item corresponding to the specific element has been changed in a period between start and end points of a setting change determination period corresponding to the specific element.

The preferentially displayed element display section is configured, when displaying a predetermined "specific screen (a top screen 61)" among the screens on the display section, to display, as a "preferentially displayed element," the specific element satisfying a predetermined "preferential display condition" as a portion (a preferentially displayed element region 61a) of the specific screen on the display section (step 1625 of FIG. 16).

In a case where the specific element is the setting element (for example, a button 78b of FIG. 7), the specific setting item is the setting item related to the specific element. In a case where the specific element is the transition element (for example, a button 78a of FIG. 7), the specific setting item is the setting item related to the setting element contained in one of the screens which is displayed through screen transition as a result of selection of the specific element.

The preferential display condition includes a condition which is satisfied when a display value increase amount (Ad) is equal to or greater than a predetermined increase amount threshold (Ath). The display value increase amount is an increase amount of the state change value corresponding to the combination of the specified driver and the specific element within a predetermined display determination period (Pd).

In the case where the specific element is the transition element, there may be a plurality of the specific setting items. The specific screen is, for example, the top screen among screens having a multi-level structure. In this case, the driver can easily change the corresponding set state by selecting the preferentially displayed element displayed on the top screen. Alternatively, the specific screen may be a screen which differs from the top screen and in which setting items which are frequently changed are put together.

The driver of the vehicle at the present point in time is specified by the driver specifying section. In general, the driving assistance functions whose set states are changed frequently differ among the drivers. Therefore, when the driver sitting in the vehicle changes, the preferentially displayed element changes.

The preferentially displayed element is selected from the specific elements. The specific elements correspond to, for example, the respective driving assistance functions. The specific elements may be such that one specific element corresponding to a certain driving assistance function is the setting element, and another specific element corresponding to another driving assistance function is the transition element. When the specific setting item corresponding to a certain specific element is changed in the setting change determination period, the state change value corresponding to the combination of the specified driver (namely, the driver of the vehicle at the present point in time) and that specific element increases.

In contrast, when the set state of the specific setting item does not change between the start and end points of the setting change determination period, the apparatus of the present disclosure does not increase the state change value. Therefore, even when the driver performs the setting procedure checking operation in the setting change determination period, the state change value does not increase. Namely, it is possible to avoid, to a possible extent, the occurrence of a "problematic situation in which the state change value increases due to the setting procedure checking operation, and as a result, a specific element corresponding to that state change value is selected as the preferentially displayed element."

In addition, the driver may repeat several times an operation of changing the set state relating to a certain driving assistance function until the operation state of that driving assistance function come to match with the driver's preference. In such a case, there is a high possibility that, after the operation state of that driving assistance function has come to match with the driver's preference, the frequency of the operation of changing the set state relating to that driving assistance function decreases. In other words, the type of the driving assistance function whose set state is changed frequently may change with time. In view of this, in the apparatus of the present disclosure, the preferentially displayed element is selected on the basis of a set state changing record (namely, an increase amount of the state change value) in a display determination period (for example, a period from a specific reference point in time to the present point in time). As a result, a specific element corresponding to a setting item (specific setting item) whose set state is changed frequently throughout the display determination period is selected as the preferentially displayed element.

Accordingly, a display element relating to a setting item whose set state is actually changed by the driver (not changed as a result of the setting procedure checking operation) is selected as the preferentially displayed element. Therefore, the apparatus of the present disclosure increases the possibility that a display element (specifically, a specific element) relating to a driving assistance function whose set state the driver of the vehicle wants to change is selected as the preferentially displayed element.

In one aspect of the apparatus of the present disclosure, the setting change determination period includes a setting change period. Namely, in the present aspect, the setting change period is a kind of the setting change determination period.

The setting change period is a period which satisfies all the following Conditions (1) to (3).

Condition (1): In a case where, before the start point of the setting change period relating to the state change value comes, the set state of the setting item relating to that state change value is changed, the point in time when that set state is changed becomes the start point of that setting change period.

Condition (2): In a case where a state in which the set state of the setting item relating to that state change value is not changed has continued for a period of time longer than a predetermined "reference time (Tc)" which is shorter than the display determination period, a point in time when that set state was changed latest becomes the end point of that setting change period.

Condition (3): In a case where the set state of the setting item relating to that state change value is changed after the end point of that setting change period, the end point of that setting change period becomes the start point of the setting change period newly starting.

Even when the driver changes the set state of a certain setting item, the corresponding state change value is not increased if the set state is returned to the original state before elapse of the reference time. Namely, such a set state change is determined to occur due to the setting procedure checking operation. Therefore, according to the present aspect, it becomes possible to avoid, to a possible extent, an increase in the state change value due to the setting procedure checking operation.

In another aspect of the apparatus of the present disclosure, the setting change determination period includes at least one of a period (travel start period) from a point in time when operation of the control section is started by the specified driver to a point in time when travel of the vehicle is started for the first time, and a period (travel end period) from a point in time when the last travel of the vehicle is ended before the operation of the control section is stopped by the specified driver to a point in time when the control section ends its operation.

Namely, in the present aspect, at least one of the travel start period and the travel end period is a kind of the setting change determination period. It is considered that, in many cases, the setting procedure checking operation is performed in the travel start period and the travel end period. Therefore, according to the present aspect, it becomes possible to avoid, to a possible extent, an increase in the state change value due to the setting procedure checking operation performed in the travel start period and the travel end period.

In still another aspect of the apparatus of the present disclosure, the control section includes a travel state determination section which determines which one of predetermined travel state patterns corresponds to a travel state of the vehicle.

In addition, the preferential display condition includes a condition which is satisfied when the specific element is related to the travel state pattern corresponding to the travel state of the vehicle.

The driving assistance functions provided by the vehicle include a driving assistance function which becomes particularly useful in a particular travel state (for example, entry to a parking lot or travel on an expressway). In addition, the operation of changing the set state relating to a certain driving assistance function is highly likely to be performed in a situation in which that driving assistance function is utilized. According to the present aspect, the preferentially displayed element is selected in accordance with the travel state of the vehicle. This further increases the possibility that the setting item whose set state the driver wants to change is selected as the preferentially displayed element.

In still another aspect of the apparatus of the present disclosure, the start point of the display determination period is a predetermined time on a day which is a predetermined number of days before, counted excluding days on which the vehicle was not driven by the specified driver, and the end point of the display determination period is a point in time when the specific screen is displayed on the display section.

The frequency of driving the vehicle may differ among drivers. For example, whereas a certain driver drives the vehicle every day, in some cases another driver does not drive the vehicle over a relatively long period of time. Therefore, if the setting change determination period is determined without consideration of the driving frequency of each driver, there arises the possibility that although the preferentially displayed element is appropriately selected for a certain driver, the preferentially displayed element is not appropriately selected for other drivers.

In the present aspect, days on which a certain driver does not drive the vehicle are excluded from the setting change determination period corresponding to the driver. Therefore, according to the present aspect, the possibility that the setting item whose set state the driver wants to change is selected as the preferentially displayed element increases further.

In still another aspect of the apparatus of the present disclosure, the preferentially displayed element display section displays a predetermined number of the preferentially displayed elements in the specific screen in a descending order determined on the basis of the display value increase amount relating to the specified driver.

According to the present aspect, the driver can easily select, from the selection elements displayed on the specific screen, a display element relating to a driving assistance function whose set state the driver wants to change.

In still another aspect of the apparatus of the present disclosure, the specific screen is a screen determined such that the number of screen transitions necessary for the specified driver to display the screen related to the transition element which is the preferentially displayed element becomes smaller in a case where the specified driver selects the transition element displayed in the specific screen, as compared with a case where the specified driver does not select the transition element displayed in the specific screen.

For example, in a case where the various screens selectively displayed on the display section have a multi-level structure in which the top screen is located at the top, if the driver wants to display the setting screen for a certain driving assistance function, the driver must switch the displayed screen from the top screen to that setting screen through other screens (for example, a setting item listing screen). In the present aspect, in a case where the top screen is the specific screen, the driver can display the setting screen, without passing through the setting item listing screen, by selecting the transition element (preferentially displayed element) displayed on the top screen. Namely, the number of screen transitions decreases. Therefore, according to the present aspect, the driver can easily display the setting screen for the driving assistance function for which the driver wants to perform setting change.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

BRIEF DESCRIPTION OF THE DRAWINGS

FIG. 4 is a table showing a list of driving assistance functions which the present assisting apparatus provides;

FIG. 14 is a table showing an example of increase amounts of the state change value on a daily basis;

DESCRIPTION OF THE EMBODIMENT

Figure 1:
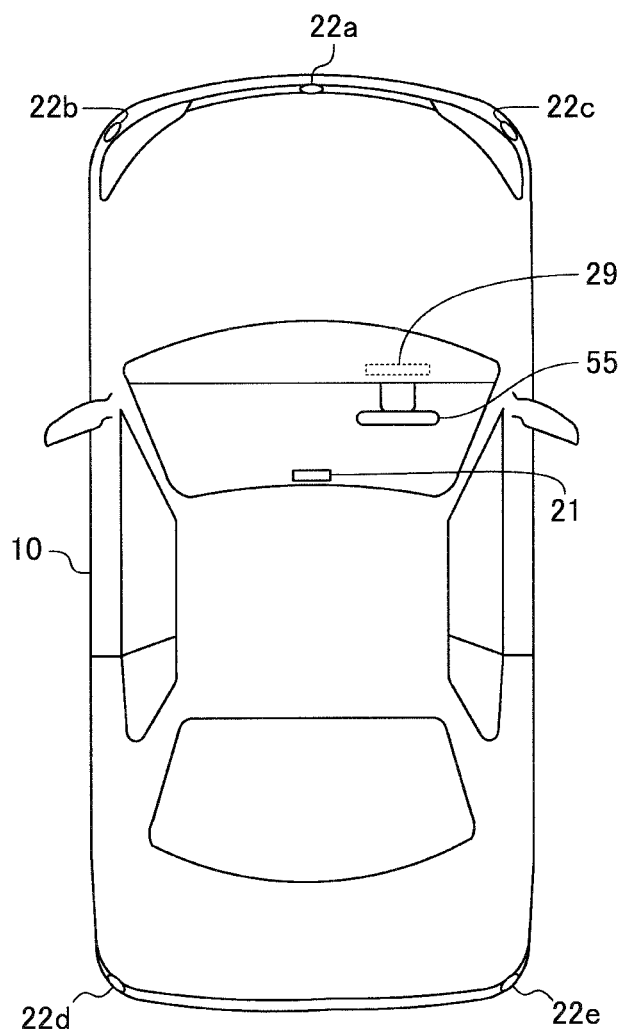
FIG. 1 is a schematic diagram of a vehicle (present vehicle) on which a changing operation assisting apparatus according to an embodiment of the present disclosure (present assisting apparatus) is mounted.
Figure 2:
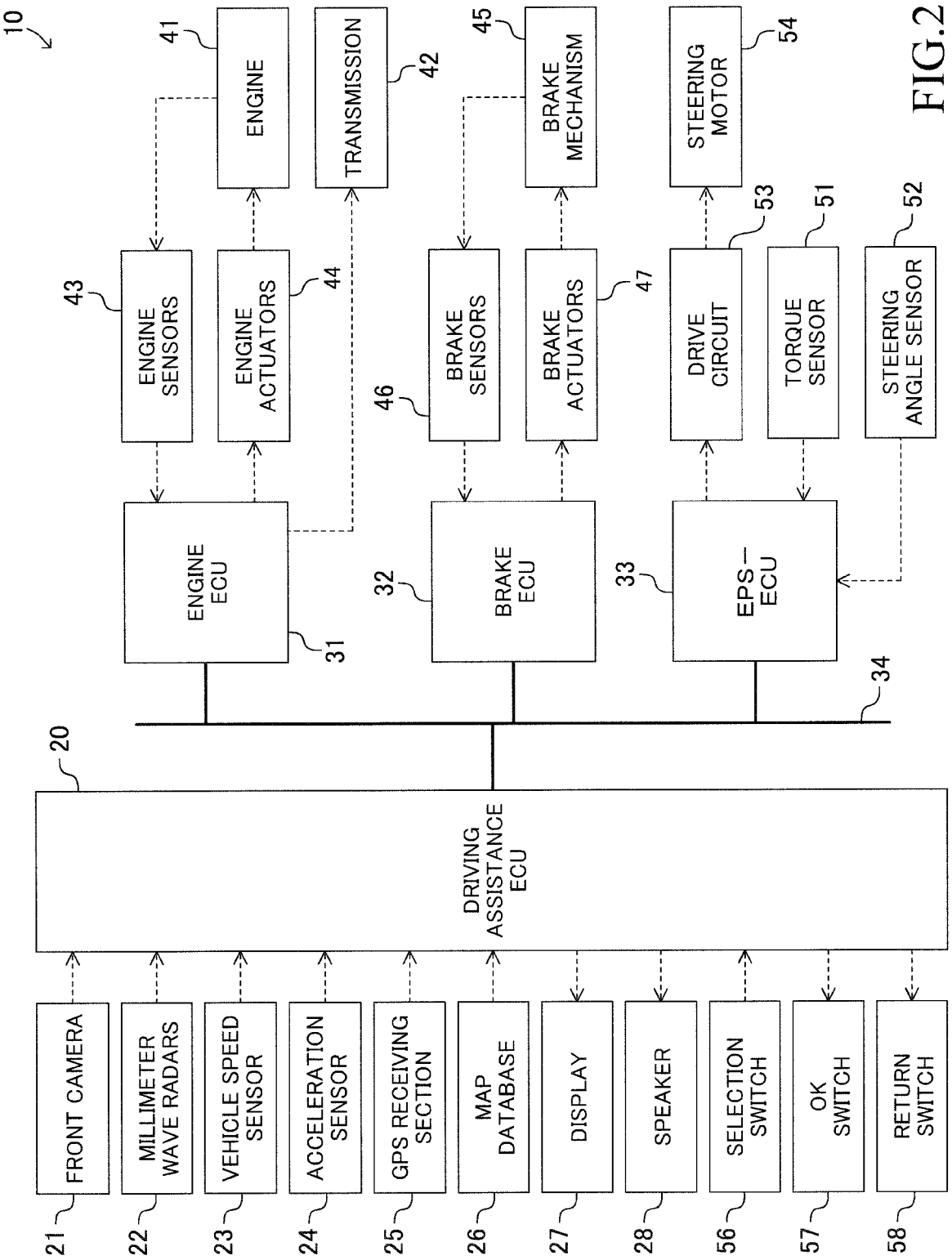
FIG. 2 is a block diagram of the present vehicle.

A changing operation assisting apparatus according to an embodiment of the present disclosure (hereinafter also referred to as the "present assisting apparatus") will now be described with reference to the drawings. The present control apparatus is applied to a vehicle 10 shown in FIG. 1. In addition, a block diagram of the vehicle 10 is shown in FIG. 2. The present assisting apparatus includes "a drive assistance ECU 20, an engine ECU 31, a brake ECU 32, and an EPS-ECU 33" each of which is an electronic control unit (ECU).

The drive assistance ECU 20 includes a micro-computer, as a major component, which is equipped with a CPU, a non-volatile memory and a RAM. The CPU performs data reading, numerical computation, computation result output, and so on by repeatedly executing predetermined programs (routines). The non-volatile memory is formed by a flash memory and stores the programs executed by the CPU, lookup tables (maps) read by the CPU during execution of the programs, set states of driving assistance functions described later, and the like. The RAM temporarily stores data read by the CPU.

Each of the engine ECU 31, the brake ECU 32 and the EPS-ECU 33 includes a micro-computer as a major component, similarly to the drive assistance ECU 20. These ECUs can perform data communication (can exchange data) with one another through a CAN (controller area network) 34. In addition, through the CAN 34, each ECU can receive, from one of other ECUs, output values of a sensor connected to the one of the other ECUs.

The drive assistance ECU 20 is connected to a front camera 21, millimeter wave radars 22, a vehicle speed sensor 23, an acceleration sensor 24, a GPS receiving section 25, a map database 26, a multi information display 27, and a speaker 28.

The front camera 21 (see FIG. 1) captures (takes) an image of a region in front of the vehicle 10 (hereinafter also referred to as "a front image") and outputs signals representing the front image to the drive assistance ECU 20 every time a predetermined time elapses.

The millimeter wave radars 22 includes a front center radar 22a, a front left radar 22b, a front right radar 22c, a rear left radar 22d, and a rear right radar 22e (see FIG. 1), each of which is a radar unit.

The front center radar 22a detects a target in a region located forward of the vehicle 10. The front left radar 22b detects a target in a region located forward and leftward of the vehicle 10. The front right radar 22c detects a target in a region located forward and rightward of the vehicle 10. The rear left radar 22d detects a target in a region located backward and leftward of the vehicle 10. The rear right radar 22e detects a target in a region located backward and rightward of the vehicle 10.

Each of the radar units contained in the millimeter wave radars 22 transmits (radiates) a radio wave of the millimeter wave band and receives a reflected wave of the transmitted wave generated by a target so as to obtain information as "target information" which represents a direction, a distance and a relative speed, and so on of the target with respect to the vehicle 10. In addition, each of the radar units outputs the target information to the drive assistance ECU 20 every time a predetermined time elapses.

The vehicle speed sensor 23 detects a vehicle speed Vs which is the travel speed of the vehicle 10 and outputs a signal representing the vehicle speed Vs to the drive assistance ECU 20. The acceleration sensor 24 detects an acceleration As of the vehicle 10 in the longitudinal direction and outputs a signal representing the acceleration As to the drive assistance ECU 20.

The GPS receiving section 25 obtains a present position Pn of the vehicle 10 on the basis of signals (radio waves) from GPS (Global Positioning System) satellites and outputs a signal representing the present position Pn to the drive assistance ECU 20.

The map database 26 is formed by a hard disk drive (HDD) and stores a map data. The map database 26 includes information (map information) regarding "nodes," "links" and "facilities." The nodes are intersections, dead ends, and so on. The links are roads, each connecting between the nodes. The facilities are buildings, and parking lots (car parks), and so on, located along the links. In addition, the map information regarding the links includes road categories (in the present embodiment, any one of ordinary road, expressway, and limited highway including freeway exclusively for motor vehicles).

Figure 3:
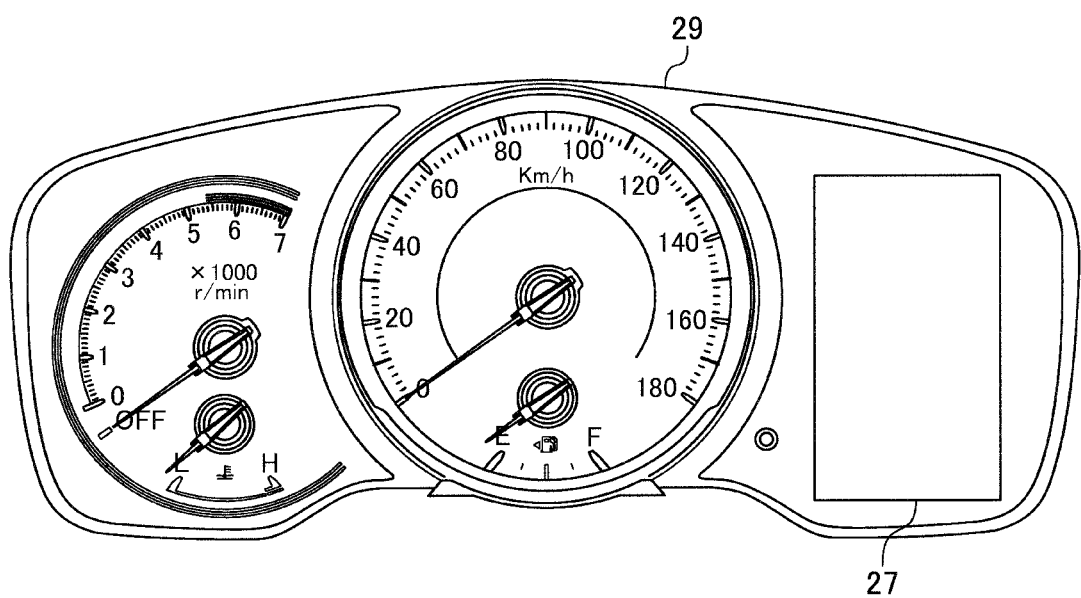
FIG. 3 is an illustration showing an instrument panel on which a display section of the present assisting apparatus is disposed.

The multi information display 27 is disposed on an instrument panel 29 shown in FIG. 3. The instrument panel 29 is mounted at a position which a driver of the vehicle 10 can view (namely, in front of the driver, see FIG. 1) and notifies the driver of driving status of the vehicle 10.

The multi information display 27 is equipped with a LCD (liquid crystal display). Characters, figures, and so on, displayed on the multi information display 27 are controlled by the drive assistance ECU 20. The multi information display 27 is also referred to as the display 27 for simplification.

Execution status of the driving assistance functions is displayed on the display 27. In addition, as described later, the driver of the vehicle 10 can change the set states related to the driving assistance functions while referring to screens displayed on the display 27.

The speaker 28 is disposed inside a vehicle compartment of the vehicle 10. A warning sound and a voice message played by the speaker 28 are controlled by the drive assistance ECU 20.

Further, the drive assistance ECU 20 is connected to a selection switch 56, an OK switch 57, and a return switch 58, and is configured to receive information (a signal) about an operation by the driver to these switches. Changing processing of the set state related to the driving assistance functions executed responding to the operation to these switches is described later.

Control of Drive Force

The engine ECU 31 controls an engine 41 and a transmission 42 so as to adjust (control) drive force of the vehicle 10. The engine ECU 31 is connected to a plurality of engine sensors 43 and receives detection signals from these sensors. The engine sensors 43 detect operation state quantities (parameters) of the engine 41. The engine sensors 43 include an accelerator pedal operation amount sensor, a throttle valve opening sensor, an engine rotational speed sensor, an intake air amount sensor, and so on. The engine ECU 31 determines a required drive torque Dreq on the basis of the vehicle speed Vs and output values of the engine sensors 43.

In addition, the engine ECU 31 is connected to engine actuators 44 which include a throttle valve actuator and a fuel injection valve, and controls the engine actuators 44 so as to control torque generated by the engine 41. The engine ECU 31 controls the engine actuators 44 and the transmission 42 such that a "drive torque Dd which is a torque transmitted to drive wheels of the vehicle 10" coincides with the required drive torque Dreq, to thereby control the acceleration As.

Further, when the engine ECU 31 receives a "drive force control request" including a target drive force Ddtg from the drive assistance ECU 20, the engine ECU 31 controls the engine actuators 44 and the transmission 42 such that the actual drive torque Dd coincides with the target drive force Ddtg.

Control of Brake Force

The brake ECU 32 controls a brake mechanism 45 which is formed by hydraulic friction brake apparatus installed on the vehicle 10. The brake ECU 32 is connected to a plurality of brake sensors 46 and receives detection signals from these sensors. The brake sensors 46 detect state quantities used for controlling the brake mechanism 45. The brake sensors 46 include an operation amount sensor for detecting the operation amount of a brake pedal, pressure sensors of brake oil applied to the brake mechanism 45, and so on. The brake ECU 32 determines a required brake force Breq on the basis of the vehicle speed Vs and output values of the brake sensors 46.

In addition, the brake ECU 32 is connected to a plurality of brake actuators 47 which are hydraulic actuators of the brake mechanism 45. The brake ECU 32 controls the brake actuators 47 such that "a brake force Bf which is a frictional brake force applied to each of wheels" coincides with the required brake force Breq so as to control the acceleration As (in this case, negative acceleration; namely, deceleration).

Further, when the brake ECU 32 receives a "brake force control request" including a target brake force Bftg from the drive assistance ECU 20, the brake ECU 32 controls the brake actuators 47 such that the actual brake force Bf coincides with the target brake force Bftg.

Control of Steering Assist Torque and Steering Angle

The EPS-ECU 33 is connected to a torque sensor 51 and a steering angle sensor 52 and receives detection signals from these sensors. The torque sensor 51 detects a steering torque Ts which is a torque applied to a steering wheel 55 (see FIG. 5) by the driver, and outputs a signal representing the steering torque Ts to the EPS-ECU 33. The steering angle sensor 52 detects a steering angle θs which is a rotation angle of the steering wheel 55, and outputs a signal representing the steering angle θs to the EPS-ECU 33.

The EPS-ECU 33 determines a target assist torque Tatg which is a target value of a torque for assisting driver's operation to the steering wheel 55 (namely, an assist torque), on the basis of the vehicle speed Vs, the steering torque Ts, the steering angle θs, and so on.

The EPS-ECU 33 is connected to a drive circuit 53. The drive circuit 53 supplies electrical power to a steering motor 54. The steering motor 54 generates a torque Tm which is a torque for rotating a steering shaft. The EPS-ECU 33 controls the drive circuit 53 such that the torque Tm coincides with target assist torque Tatg.

Further, when the EPS-ECU 33 receives a "steering angle control request" including a target steering angle θstg from the drive assistance ECU 20, the EPS-ECU 33 controls the steering motor 54 such that the actual steering angle θs coincides with the target steering angle θstg.

Overview of Driving Assistance Functions

The drive assistance ECU 20 provides various driving assistance functions so as to assist drive operation of the vehicle 10 by the driver. A table of the driving assistance functions provided by the drive assistance ECU 20 is shown in FIG. 4. An overview of the driving assistance functions will be described below.

(1) Pre-Crush Safety (PCS)

A pre-crush safety function is a function for generating an alert, generating the brake force Bf, and so on, in a case where the vehicle 10 is highly likely to collide with an obstacle (specifically, another vehicle, a bicycle, a pedestrian, and so on) while the vehicle 10 is moving forward. Alerts and notifications related to the pre-crush safety function and the other of driving assistance functions are provided through the display 27 and the speaker 28.

A setting item related to the pre-crush safety function is an "actuation (generation) timing of a collision alert." The driver can set the actuation timing of a collision alert to any one of "early (namely, relatively early timing)," "middle (namely, intermediate timing)" and "late (namely, relatively late timing)."

(2) Lane Tracing Assist (LTA)

A lane tracing assist function is a function for generating an alert, controlling the steering angle θs, and so on such that the vehicle 10 travels (runs) along a lane in which the vehicle 10 is running (hereinafter also referred to as an "own lane") when the vehicle 10 is traveling on a "assist targeted roadway (specifically, an express highway, or a limited highway)." The lane tracing assist function is also referred to as a "lane keeping assist (LKA)."

(3) Road Sign Assist (RSA)

A road sign assist function is a function for recognizing a roadway sign located ahead of the vehicle 10 and displaying a symbol representing the recognized roadway sign on the display 27. In addition, if a travel state of the vehicle 10 violates a traffic regulation represented by the recognized roadway sign while the road sign assist function is being executed, an alert is generated to the driver.

In an example of a screen (a top screen 61 described later) displayed on the display 27 shown in FIG. 7, a roadway sign 81 represents a speed limit sign recognized by the road sign assist function.

(4) Radar Cruise Control

A radar cruise control function is a function for controlling the acceleration As such that a distance between the vehicle 10 and another proceeding vehicle (hereinafter also referred to as a "following target vehicle") traveling ahead of the vehicle 10" coincides with a predetermined target inter-vehicular distance without driver's operation to the accelerator pedal. The radar cruise control function is also referred to as an "adaptive cruise control (ACC)."

A setting item related to the radar cruise control function is the "target inter-vehicular distance." The driver can set the target inter-vehicular distance to any one of "long (namely, relatively long distance)," "middle (namely, intermediate distance)" and "short (namely, relatively short distance)."

Figure 7:
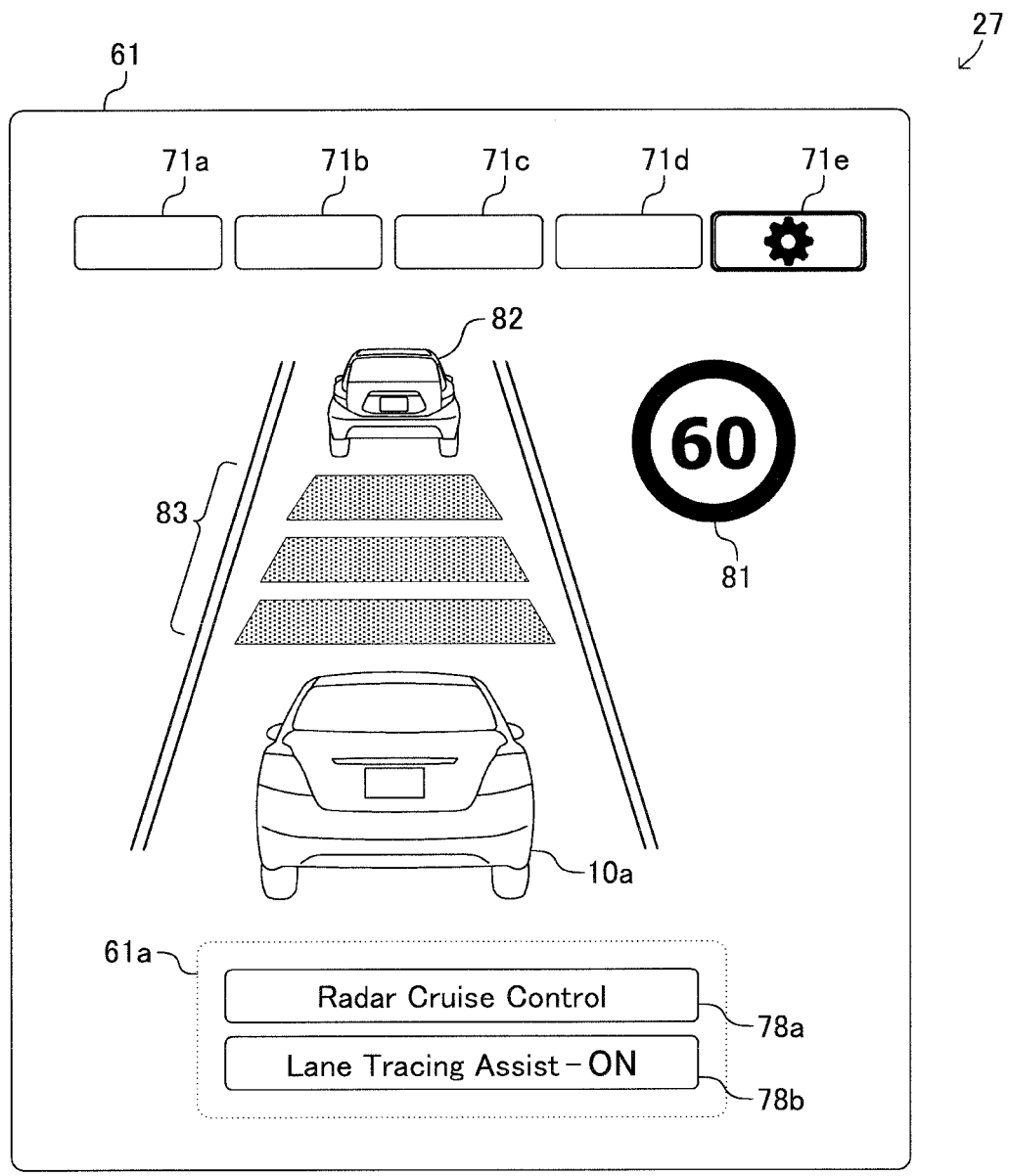
FIG. 7 is an illustration of a top screen which the present assisting apparatus displays on the display section.

In the top screen 61 shown in FIG. 7, a vehicle symbol 10a represents the vehicle 10 and a vehicle symbol 82 represents the following target vehicle. In addition, a following distance symbol 83 indicates that the target inter-vehicular distance is set to the "long."

(5) Preceding Vehicle Start Notification

A preceding vehicle start notification function is a function for notifying the driver of a preceding vehicle's starting when a distance between the vehicle 10 which continues stopping and the preceding vehicle which has started running (moving) becomes equal to or greater than a "notification distance," after the vehicle 10 stopped behind the preceding vehicle.

A setting item related to the preceding vehicle start notification function is the "notification distance." The driver can set the notification distance to any one of the "long," the "middle" and the "short."

(6) Blind Spot Monitoring (BSM)

A blind spot monitoring function is a function for notifying the driver of presence of an obstacle on the rear side of the vehicle 10 if the obstacle is present while the vehicle 10 is changing lanes.

(7) Clearance Sonar

A clearance sonar function is a function for notifying the driver of an obstacle (especially, a stationary object; for example, a wall) in the vicinity of the vehicle 10 if such an obstacle is present.

(8) Rear Cross Traffic Alarm (RCTA)

A rear cross traffic alarm function is a function for notifying the driver of an obstacle (especially, another vehicle) approaching the vehicle 10 on the rear side of the vehicle 10 if such an obstacle is present while the vehicle 10 is moving back.

(9) Parking Support Brake (PKSB)

A parking support brake function is a function for generating an alert, generating the brake force Bf, and so on in a case where the vehicle 10 is highly likely to collide with an obstacle (especially, a wall, or another vehicle) while the vehicle 10 is moving at low speeds.

In order to provide these driving assistance functions, the drive assistance ECU 20 utilizes the front image received from the front camera 21 and the target information received from the millimeter wave radars 22. In addition, in order to provide the driving assistance functions, the drive assistance ECU 20 controls the engine ECU 31, the brake ECU 32, and the EPS-ECU 33, as needed basis. Namely, the drive assistance ECU 20 transmits the drive force control request, the brake force control request, and/or the steering angle control request, if necessary.

For example, while the lane tracing assist function is being executed, the drive assistance ECU 20 obtains (determines) the target steering angle θstg every time a predetermined time elapses and transmits the steering angle control request including that target steering angle θstg to the EPS-ECU 33. In order to obtain the target steering angle θstg, the drive assistance ECU 20 extracts (recognizes) a pair of lane segmentations (markers) (namely, lane segmentation lines) which defines the own lane (namely, a left side lane segmentation line and a right side lane segmentation line) included in the front image by a well-known method.

In addition, the drive assistance ECU 20 obtains (determines), as a lane center line, a set of center points in the horizontal (lateral) direction between the left side lane segmentation line and the right side lane segmentation line, each of the lane segmentation lines extending ahead of the vehicle 10, based on a position of the vehicle 10 relative to those lane segmentation lines. Further, the drive assistance ECU 20 obtains (determines) the target steering angle θstg such that the vehicle 10 travels on the lane center line.

Furthermore, while executing the radar cruise control function, the drive assistance ECU 20 obtains (determines) a target acceleration Astg every time a predetermined time elapses. In order to obtain (determine) the target acceleration Astg, the drive assistance ECU 20 obtains a distance and a relative speed between the vehicle 10 and the following target vehicle on the basis of the target information. In addition, the drive assistance ECU 20 controls the engine ECU 31 and the brake ECU 32 such that the actual acceleration As coincides with the target acceleration Astg.
(Changing Procedure of Set States related to Driving Assistance Functions)

Figure 5:
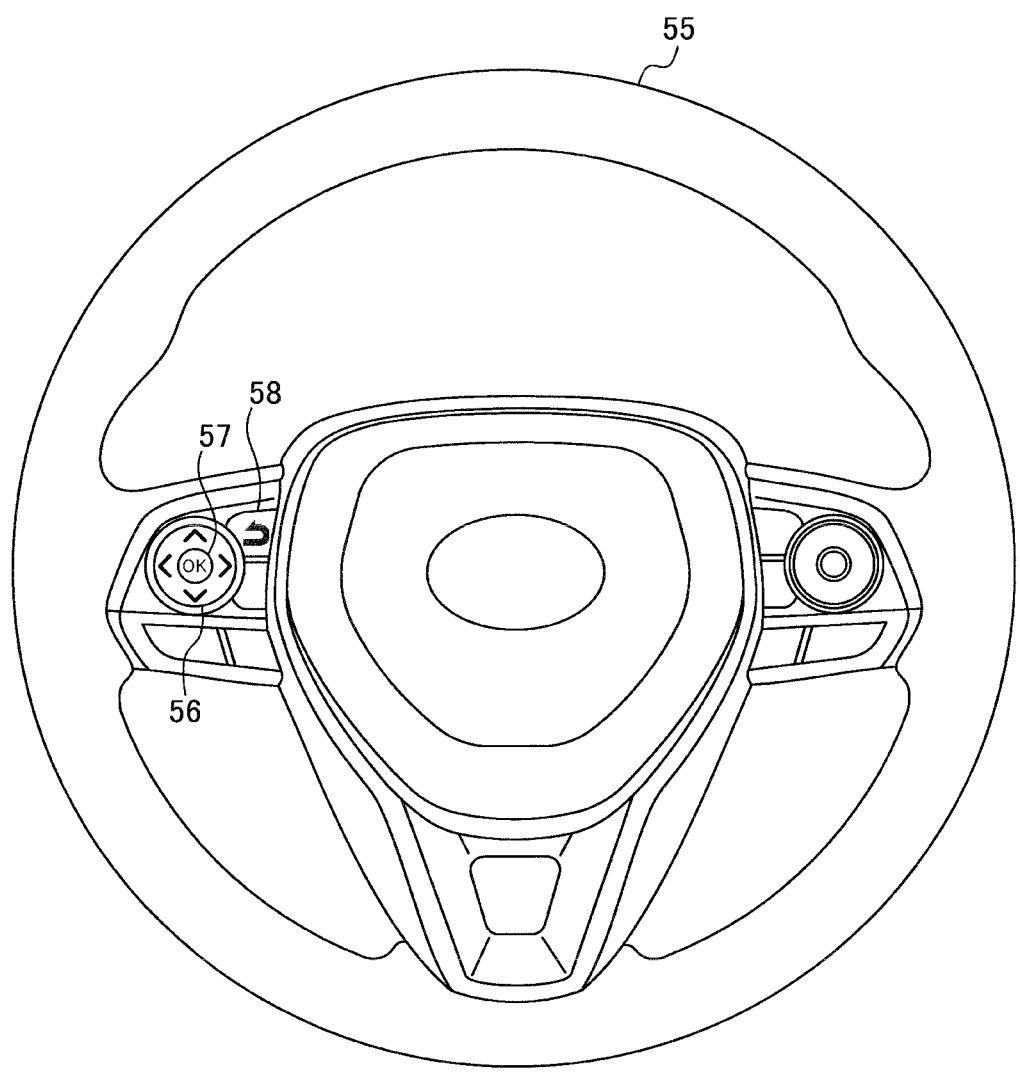
FIG. 5 is an illustration of a steering wheel on which an operation section of the present assisting apparatus is mounted.

The driver of the vehicle 10 can change the set states (setting values, parameters) related to the driving assistance functions by operation (manipulation) to the selection switch 56 and the OK switch 57 arranged on the steering wheel 55 shown in FIG. 5 while referring to screens displayed on the display 27. The selection switch 56 and the OK switch 57 are also referred to as an "operation section" collectively for convenience' sake. Namely, the driver operates the operation section so as to change the set states related to the driving assistance functions, and the drive assistance ECU 20 provides the above-described driving assistance functions on the basis of the changed set states.

When the driver changes the set states related to the driving assistance functions, various "screens" are switched to be displayed on the display 27. Various "display elements" are contained in each of the screens. More specifically, the drive assistance ECU 20 selectively displays one of the predefined screens.

The display elements include "setting elements" and "transition elements." Each of the setting elements is associated with each of the "setting items." Namely, each of the setting elements has been related to a setting item relating to a driving assistance function in advance. Each of the transition elements is associated with one of the screens, the one of the screens being different from the screen which is being displayed on the display 27. Namely, each of the transition elements has been related to a different one of the screens in advance. The setting elements and the transition elements are also referred to as "selection elements" collectively for convenience' sake.

The driver selects one of the selection elements contained (included) in a screen displayed on the display 27 by use of the selection switch 56 and the OK switch 57. The selection switch 56 is so-called "cross key" and contains buttons of four directions (namely, up, down, right and left). The driver uses the selection switch 56 to highlight the desired one of the selection elements, and pushes the OK switch 57 so that the highlighted selection element is selected.

Further, the return switch 58 is provided on the steering wheel 55. When the driver pushes the return switch 58, the drive assistance ECU 20 displays, on the display 27, the screen (i.e., previous screen) which had been displayed immediately before the currently displayed screen was displayed. In other words, when the return switch 58 is pushed, the drive assistance ECU 20 executes the same processing as the processing executed when any one of a back button 73a to a back button 73e described later is selected.

When one of the setting elements is selected, the drive assistance ECU 20 changes the set state with which the selected setting element is associated. When one of the transition elements is selected, the drive assistance ECU 20 displays the screen with which the selected transition element is associated.

Figure 6:
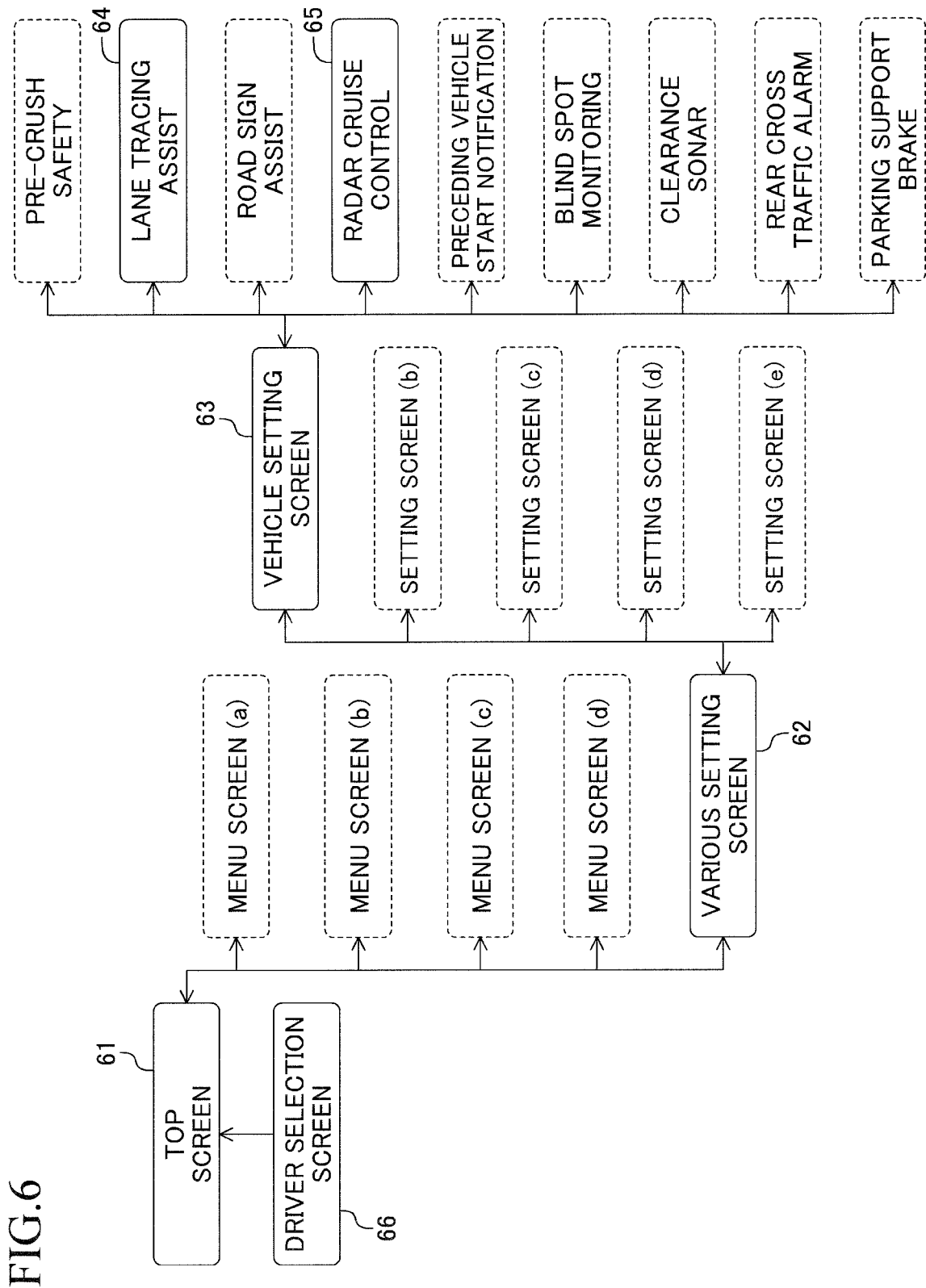
FIG. 6 is a screen transition diagram of screens which the present assisting apparatus displays on the display section.

FIG. 6 illustrates a screen transition diagram of the screens to be displayed on the display 27 when the driver intends to change the set states related to the drive assistance functions. In FIG. 6, arrows (specifically, arrowed lines connecting between screens) which represent screen transitions (namely, transitions of screens displayed on the display 27) are aggregated. Namely, parts of arrows are overlapped with each other. In addition, concrete descriptions about the screens indicated with broken lines in FIG. 6 are omitted.

An example of the top screen 61 shown in FIG. 6 is illustrated in FIG. 7. In the top screen 61, a button 71a to a button 71e which are transition elements are displayed. A preferentially displayed element region 61a contained in the top screen 61 will be described later.

The button 71a to the button 71d are associated with a menu screen (a) to a menu screen (d), shown in FIG. 6, respectively. Meanwhile, the button 71e is associated with the various setting screen 62 shown in FIG. 6.

Highlighted display elements (buttons) are indicated with thick lines (heavy lines) surrounding the elements in FIG. 7 and in other screens shown in FIG. 8 to FIG. 12 described later as examples. In the example shown in FIG. 7, the button 71e is highlighted.

When the button 71e is selected by the driver's operation to the operation section (namely, when the OK switch 57 is pushed while the button 71e is being highlighted), the various setting screen 62 is displayed on the display 27. The various setting screen 62 displayed on the display 27 is shown in FIG. 8.

Figure 8:
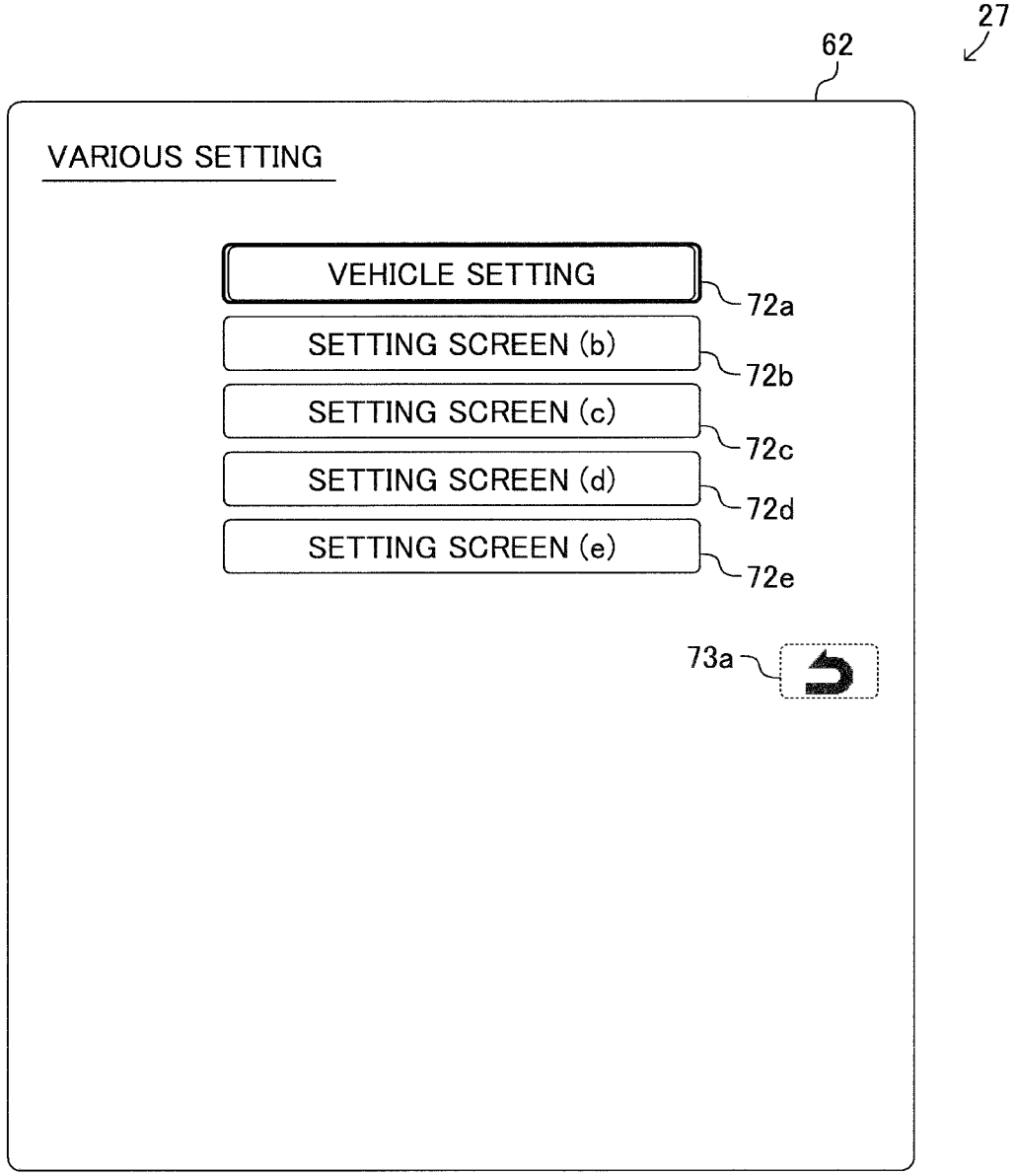
FIG. 8 is an illustration of a various setting screen which the present assisting apparatus displays on the display section.

As shown in FIG. 8, in the various setting screen 62, a button 72a to a button 72e which are transition elements and the back button 73a are contained (displayed). When the back button 73a is selected, the top screen 61 is displayed on the display 27 again. Namely, the screen displayed on the display 27 switches back to the top screen 61.

Figure 9:
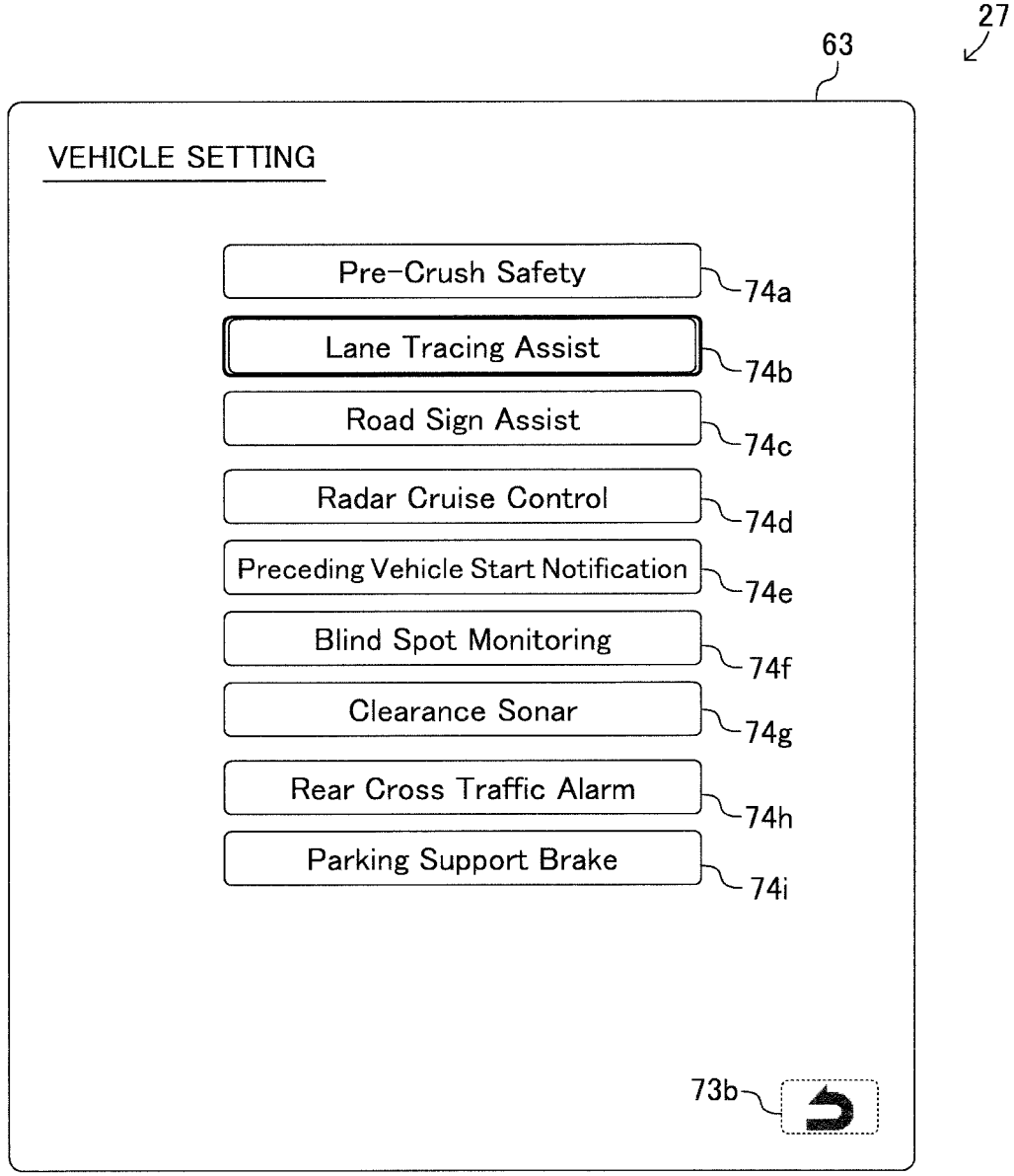
FIG. 9 is an illustration of a vehicle setting screen which the present assisting apparatus displays on the display section.

The button 72a is associated with the vehicle setting screen 63 shown in FIG. 6. Therefore, when the button 72a is selected, the vehicle setting screen 63 shown in FIG. 9 is displayed on the display 27.

In the vehicle setting screen 63, a button 74a to a button 74i which are transition elements and the back button 73b are contained (displayed). When the back button 73b is selected, the various setting screen 62 is displayed on the display 27 again.

The button 74a to the button 74i are associated with setting screens related to the above-described driving assistance functions, respectively. For example, the button 74b is associated with the lane tracing assist setting screen 64 (hereinafter also referred to as the LTA setting screen 64 for simplification) shown in FIG. 6. The button 74d is associated with the radar cruise control setting screen 65 (hereinafter also referred to as the RCC setting screen 65 for simplification) shown in FIG. 6. Therefore, when the button 74b is selected, the LTA setting screen 64 illustrated in FIG. 10 is displayed on the display 27.

Figure 10:
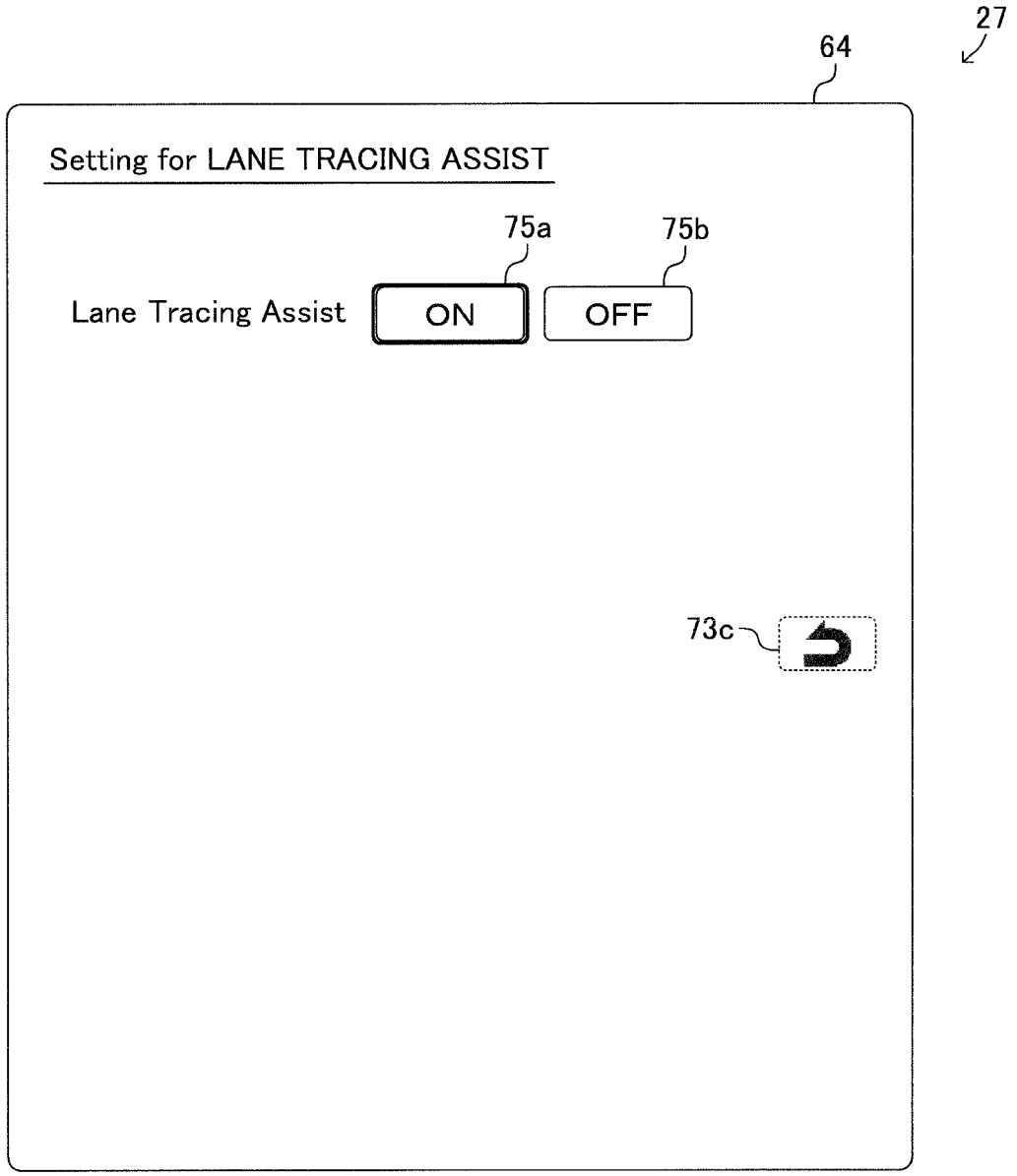
FIG. 10 is an illustration of a LTA (lane tracing assist) setting screen which the present assisting apparatus displays on the display section.

As shown in FIG. 10, a button 75a to a button 75b which are setting elements and the back button 73c are contained (displayed) in the LTA setting screen 64. When the LTA setting screen 64 is displayed on the display 27, the driver can switch the request state of the lane tracing assist function between an ON state and an OFF state.

In the setting screens related to the driving assistance functions including the LTA setting screen 64, the setting element which is associated with the set state at the point in time when that setting screen starts to be displayed is highlighted. In the example shown in FIG. 10, the request state of lane tracing assist function is set at the ON state. Therefore, the button 75a which is associated with the set state (setting item) related to the ON state is highlighted.

In this case, if the driver wants to switch the request state of the lane tracing assist function from the ON state to the OFF state, the driver selects the button 75b which is associated with the set state (setting item) related to the OFF state. Meanwhile, when the back button 73c is selected, the vehicle setting screen 63 is displayed on the display 27 again.

Figure 11:
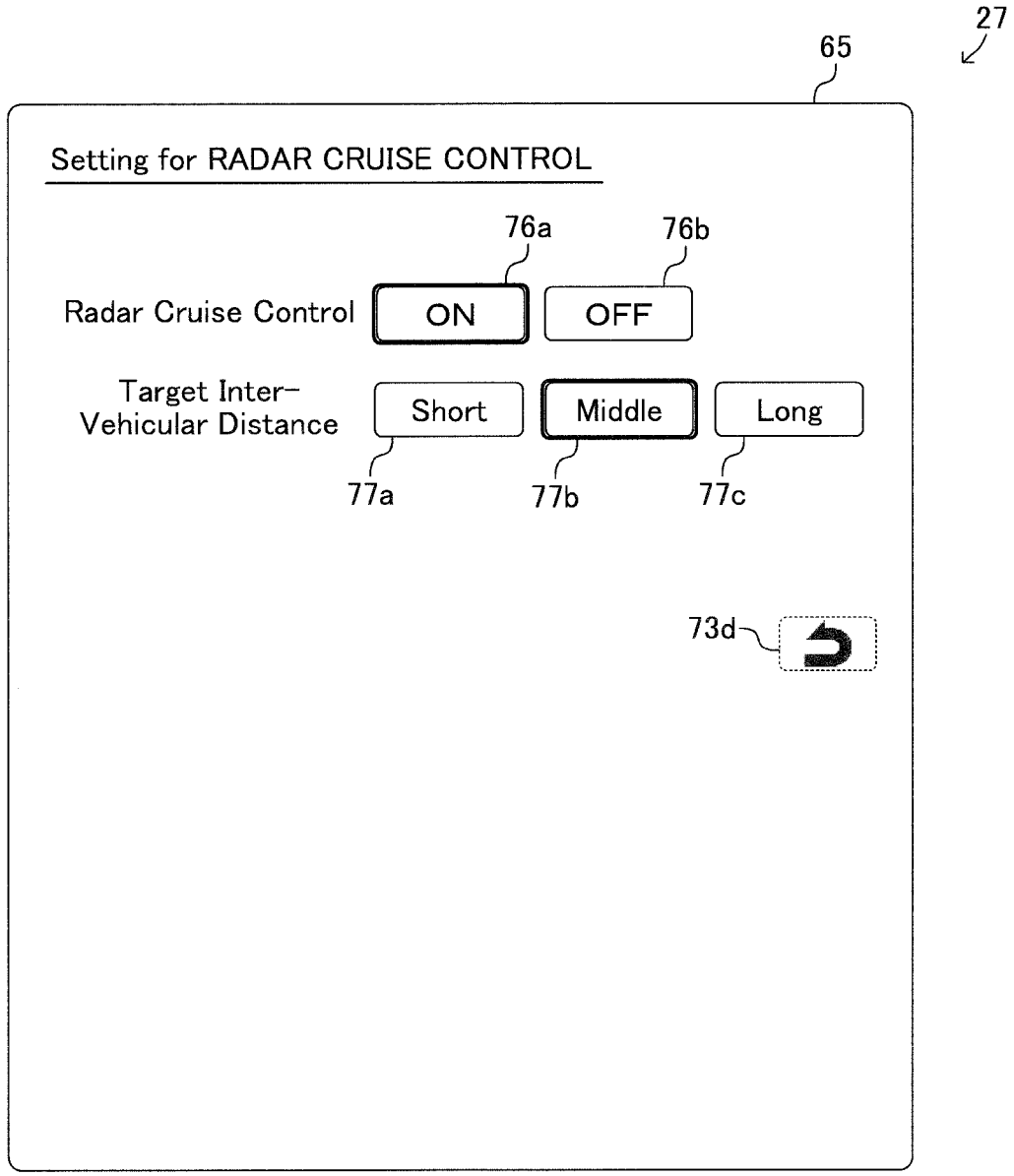
FIG. 11 is an illustration of a RCC (radar cruise control) setting screen which the present assisting apparatus displays on the display section.

When the button 74d is selected while the vehicle setting screen 63 shown in FIG. 9 is being displayed, the RCC setting screen 65 illustrated in FIG. 11 is displayed on the display 27. A button 76a, a button 76b, a button 77a to a button 77c, and the back button 73d are contained (displayed) in the RCC setting screen 65.

The button 76a and the button 76b are buttons to be selected so as to set the request state of the radar cruise control function. The button 77a to the button 76c are buttons to be selected so as to set the target inter-vehicular distance which is the setting item related to the radar cruise control function. The button 77a to the button 77c are associated with the "short," the "middle" and the "long", respectively.

As understood from FIG. 11, a setting screen related to the driving assistance function having a "setting item other than the request state which is either the ON state or the OFF state" contains a setting element associated with the other setting item. In the example shown in FIG. 11, the request state of the radar cruise control function is set at the ON state, and the target inter-vehicular distance is set at the "middle." When the back button 73d is selected, the vehicle setting screen 63 is displayed on the display 27 again.

Display of Preferentially Displayed Element

Next, display elements contained in the preferentially displayed element region 61a shown in FIG. 7 will be described. The preferentially displayed element region 61a contains the selection elements (each is either the setting element or the transition element) up to (at largest) two elements. Each of the selection elements contained in the preferentially displayed element region 61a corresponds to the drive assistance function of which the set state is likely to be (has high possibility of being) changed by the driver who is currently on the vehicle 10 at the present time. The selection elements are displayed in the preferentially displayed element region 61a in descending order of the likelihood (possibility) of being changed. The display items displayed in the preferentially displayed element region 61a are also referred to as "preferentially displayed elements" for convenience' sake. In other words, when the drive assistance ECU 20 displays the top screen 61 on the display 27, the drive assistance ECU 20 selects the driving assistance functions of which the set states are likely (most and second likely) to be changed in order to display the preferentially displayed elements in the preferentially displayed element region 61a.

As understood from the above description, a hierarchic (multi-level) structure is employed (adopted) for the configuration of the setting screens related to the driving assistance functions displayed on the display 27. The hierarchic structure has the top screen 61 at the top of the hierarchy. Therefore, if the driver wants "a setting screen related to a desired driving assistance function" to be displayed on the display 27 while the top screen 61 is being displayed on the display 27, the driver needs to take the step to make (let) "the screens other than the desired setting screen (specifically, the various setting screen 62 and the vehicle setting screen 63)" be displayed on the display 27.

Meanwhile, by means of selecting a preferentially displayed element displayed in the preferentially displayed element region 61a, the driver can easily change the set state of the driving assistance function related to the selected preferentially displayed element. Specifically, the driver can make (let) the desired setting screen be displayed or can change the set state of the desired setting item, without going through multiple screen transitions.

When the drive assistance ECU 20 selects driving assistance functions related to preferentially displayed elements (namely, the driving assistance functions whose set states have high possibility of being changed), the drive assistance ECU 20 extracts "displayable candidate driving assistance functions" from among the driving assistance functions on the basis of "travel state" of the vehicle 10. In addition, the drive assistance ECU 20 extracts driving assistance functions whose display value increase amount Ad is greater than a predetermined increase amount threshold Ath from among the displayable candidate driving assistance functions. The display value increase amount Ad is a value determined (calculated) for each of combinations (pairs) of the driving assistance function and the driver who is currently on (sitting in) the vehicle 10. In the present embodiment, the display value increase amount Ad is "3."

Now, an example of the preferentially displayed elements shown in FIG. 7 and categories of the preferentially displayed elements (namely, either the setting element or the transition element) will be described, and then, the selecting method of the driving assistance functions related to the preferentially displayed elements (including a method to obtain the travel state of the vehicle 10) will be described. In the example of shown in FIG. 7, the preferentially displayed element region 61a contains a button 78a which is a transition element related to the radar cruise control function and a button 78b which is a setting element related to the lane tracing assist function.

When the button 78a is selected, the setting screen for changing the set state of the radar cruise control function (namely, the RCC setting screen 65 shown in FIG. 11) is displayed. In this case, if the back button 73d contained in the RCC setting screen 65 is selected, the top screen 61 is displayed on the display 27. Namely, when a "back button contained in a setting screen displayed as a result of selecting a transition element displayed as the preferentially displayed element in the preferentially displayed element region 61a" is selected, the top screen 61 (instead of the vehicle setting screen 63) will be displayed.

Meanwhile, the button 78b is a setting element for changing the request state of the lane tracing assist function. In this example, since the request state of the lane tracing assist function is in the OFF state at the present time, the button 78b is the setting element for switching the request state of the lane tracing assist function to the ON state. Thus, when the button 78b is selected, the request state of the lane tracing assist function is switched from the OFF state to the ON state. If the request state of the lane tracing assist function is in the ON state at the present time, a button (setting element) for switching the request state of the lane tracing assist function to the OFF state is contained in the preferentially displayed element region 61a.

Whether a preferentially displayed element is a setting element or a transition element has been determined for each of the driving assistance functions in advance. A preferentially displayed element related to each of the driving assistance functions (either the setting element or the transition element) is also referred to as a "specific element" for convenience' sake.

The drive assistance ECU 20 displays a setting element related to a certain function in the preferentially displayed element region 61a as a preferentially displayed element, if that certain function is marked with a white circle in a column Cm1 of the table shown in FIG. 4 (namely, if the function have no other setting items than the request state). Meanwhile, the drive assistance ECU 20 displays a transition element related to a certain function in the preferentially displayed element region 61a as a preferentially displayed element, if that certain function is not marked with a white circle in the column Cm1 (namely, if the certain function has setting items other than the request state). Therefore, according to the above-described example, the specific element related to the radar cruise control function is the transition element, and the specific element related to the lane tracing assist function is the setting element.

Now, the method to obtain the travel state of the vehicle 10 will be described. In the present embodiment, the travel state of the vehicle 10 is classified into "highway (namely, a state of traveling on an expressway or a limited highway)," "parking (namely, a state of traveling (or staying) in a parking lot)" and "others." The drive assistance ECU 20 determines the travel state by applying the present position Pn obtained by the GPS receiving section 25 to the map information of the map database 26. The travel states which consist of the "highway," the "parking" and the "others" are also referred to as "travel state patterns" for convenience' sake.

More specifically, when the present position Pn is on a link of the map database 26, the link representing an expressway or a limited highway, the drive assistance ECU 20 determines that the travel state of the vehicle 10 is the "highway." When the present position Pn is on a facility of the map database 26, the drive assistance ECU 20 determines that the travel state of the vehicle 10 is the "parking." If the travel state of the vehicle 10 is neither the "highway" nor the "parking," the drive assistance ECU 20 determines that the travel state of the vehicle 10 is the "others."

If the travel state of the vehicle 10 is the "highway," the drive assistance ECU 20 extracts, as the displayable candidate driving assistance functions, the driving assistance functions which are marked with a white circle in a column Cm2 of the table shown in FIG. 4. If the travel state of the vehicle 10 is the "parking," the drive assistance ECU 20 extracts, as the displayable candidate driving assistance functions, the driving assistance functions which are marked with a white circle in a column Cm3 of the table shown in FIG. 4. Meanwhile, if the travel state of the vehicle 10 is the "others," the drive assistance ECU 20 regards all of the driving assistance functions as the displayable candidate driving assistance functions.

Next, a method to specify (identify) a driver who is currently on (sitting in) the vehicle 10, and a method to calculate the display value increase amount Ad will be described.

Figure 12:
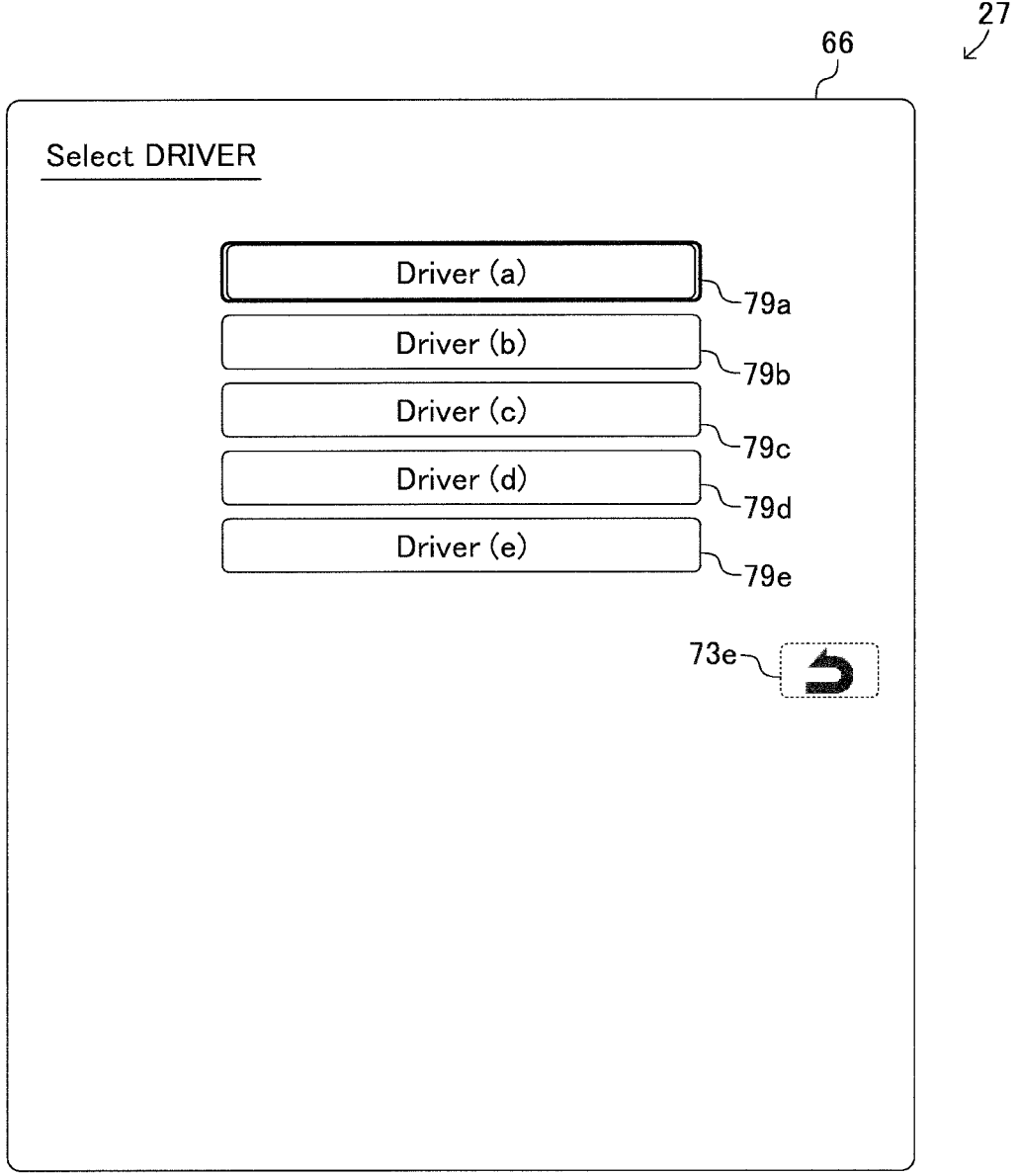
FIG. 12 is an illustration of a driver selection screen which the present assisting apparatus displays on the display section.

In order to specify a driver who is currently on the vehicle 10 at the present time, when the drive assistance ECU 20 starts operation (namely, when an ON operation to an ignition switch (not shown) of the vehicle 10 is performed), the drive assistance ECU 20 display a driver selection screen 66 shown in FIG. 12 on the display 27.

The driver selection screen 66 contains a button 79a to a button 79e and a back button 73e. Each of the button 79a to the button 79e is associated with any one of a driver (a) to a driver (e) who have been registered on/in the drive assistance ECU 20, respectively, in advance.

When the driver selects one button which is associated with himself/herself from among those buttons, the drive assistance ECU 20 specifies (identifies) the driver who is currently on the vehicle 10 at the present time. The drive assistance ECU 20 stores the specified (identified) driver in the RAM and also stores the specified driver with the date when the driver is specified in the non-volatile memory. When the back button 73e is selected, the drive assistance ECU 20 displays the top screen 61 on the display 27.

The display value increase amount Ad is figured out (obtained) as an increase amount of a state change value Sc in a predetermined display determination period Pd. Namely, the display value increase amount Ad is the difference between the state change value Sc at the end timing of the display determination period Pd and the state change value Sc at the start timing of the same display determination period Pd.

The state change value Sc is a value stored for each of specific elements (namely, the driving assistance functions) and for each of drivers of the vehicle 10. Namely, the drive assistance ECU 20 stores the state change values Sc for each of pairs (combinations) of the specific element and the driver of the vehicle 10 (in the present example, any one of the driver (a) to the driver (e)). First, a processing in which the state change value Sc is increased will be described.

If the set state of a "specific setting item" related to a specific element is changed between the start timing and the end timing of a "set state change determination period," the drive assistance ECU 20 increases the state change value Sc for the pair of the specific element and the driver who is currently on the vehicle 10 (namely, the specified driver) by "1." If the specific element is a setting element, the specific setting item is a setting item associated with the specific element. If the specific element is a transition element, the specific setting item(s) is (are) a setting item(s) associated with the setting element(s) contained in the screen which is to be displayed when the specific element is selected.

Therefore, the specific setting items corresponding to the radar cruise control function are the setting items related to the request state and the target inter-vehicular distance (see FIG. 11). The specific setting item corresponding to the lane tracing assist function is the setting item related to the request state (see FIG. 10).

In the present embodiment, the set state change determination period contains a "travel start period," a "travel end period" and a "setting change period." The travel start period refers to a period from a point in time when the ON operation to the ignition switch is performed by the driver (when the drive assistance ECU 20 starts operation) to a point in time when the vehicle 10 starts the first travel (when travel (running/moving) of the vehicle 10 is started for the first time after that ON operation).

The travel end period refers to a period from a point in time when the last travel of the vehicle 10 is ended before the operation of the drive assistance ECU 20 is stopped by the driver (before an OFF operation to the ignition switch is performed) to a point in time when the drive assistance ECU 20 is ended its operation. Namely, the travel end period ends when the OFF operation to the ignition switch (the ignition OFF operation) is performed, and the travel end period starts when the travel (running) of the vehicle 10 just prior to the ignition OFF operation ends.

The setting change period refers to a period which overlaps with neither the travel start period nor the travel end period, and which may occur repeatedly during a period of time from the end of the travel start period to the start of the travel end period. In addition, the setting change period occurs for each of the specific elements.

More specifically, in a case where a set state of the specific setting item corresponding to a specific element has not been changed for more than a predetermined reference time Tc, the setting change period is defined by a point in time when that set state lastly was changed (hereinafter also referred to as a "specific time point"). Namely, the certain specific time point is the end point in time of a certain setting change period and also the start point in time of another (following) setting change period which may occur just after the certain setting change period. In the present embodiment, the reference time Tc is 5 minutes.

If the set state of a specific setting item related to a specific element is changed between the start timing and the end timing of one of the set state change determination period, the drive assistance ECU 20 increases the state change value Sc related to the driving assistance function (namely, that specific element) by "1." The setting change period and change in the state change value Sc will next be described with reference to an example shown in FIG. 13.

Figure 13:
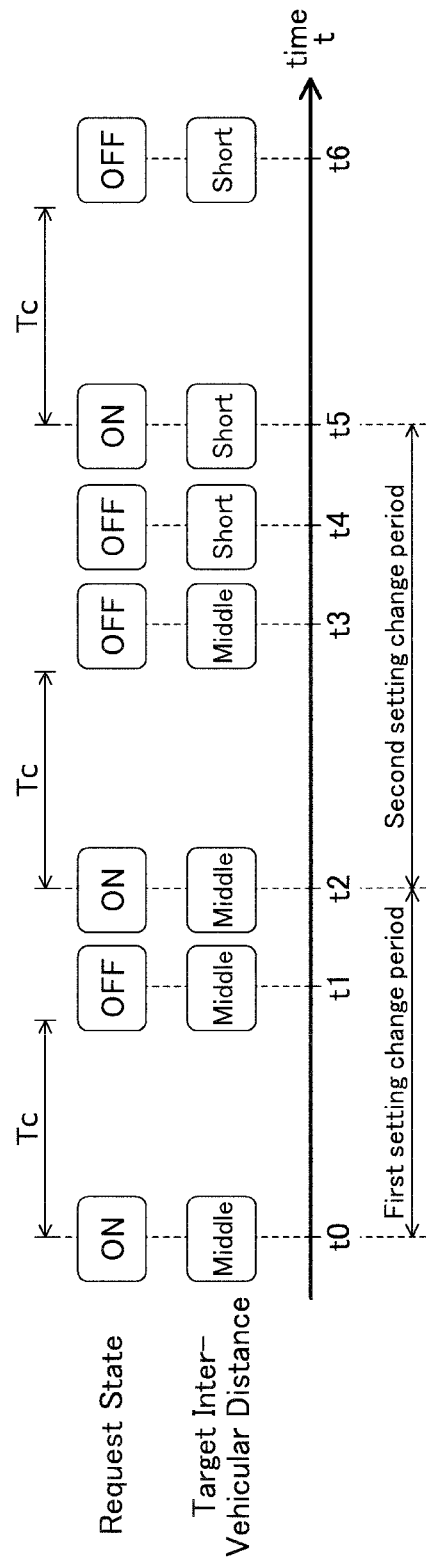
FIG. 13 is a timing chart for explaining timings at which the present assisting apparatus increases a state change value.

FIG. 13 shows changes in the set state (which is changed by use of the RCC setting screen 65 shown in FIG. 11) of the specific setting item related to the radar cruise control function (also referred to as the "RCC function" in explaining FIG. 13). A period of time from a time t0 to a time t6 shown in FIG. 13 is contained in neither the travel start period nor the travel end period.

In the present example, the set state related to the RCC function is changed at the point in time t0, and as a result, the request state of the RCC function is in the ON state and the target inter-vehicular distance is the "middle" at the point in time t0. After that, at a time t1 after elapse of a time which is longer than the reference time Tc from time t0 (namely, t1−t0>Tc), the request state of the RCC function is switched from the ON state to the OFF state. Therefore, the time t0 is the specific time point and the start point in time of the setting change period.

Further, at a time t2 after elapse of a time which is shorter than the reference time Tc from time t1 (namely, t2−t1<Tc), the request state of the RCC function is switched from the OFF state to the ON state. After that, at a time t3 after elapse of a time which is longer than the reference time Tc from time t2 (namely, t3−t2>Tc), the request state of the RCC function is switched from the ON state to the OFF state. Therefore, the time t2 is another specific time point and the end point in time of the setting change period whose start point in time is the time t0. The setting change period from the time t0 to the time t2 is also referred to as a "first setting change period."

The specific setting items related to the RCC function are not changed between the start timing (namely, the time t0) and the end timing (namely, the time t2) of the first set state change period. Therefore, an increase in the state change value Sc for the RCC function because of the changes of the set state during the first set state change period does not occur.

The time t2 is also the start timing of another setting change period (which is also referred to as a "second setting change period") which follows the first setting change period. The second setting change period includes a time t3 and a time t4 and ends at a time t5 (namely, t4−t3<Tc, t5−t4<Tc and t6−t5>Tc).

At the time t3, the request state of the RCC function is switched from the ON state to the OFF state. In addition, at the time t4, the target inter-vehicular distance is switched from the "middle" to the "short." Further, at the time t5, the request state of the RCC function is switched from the OFF state to the ON state.

The specific setting items related to the RCC function are changed between the start timing (namely, the time t2) and the end timing (namely, the time t5) of the second set state change period. Therefore, the state change value Sc for the RCC function is increased by "1" due to the changes in the set state during the second set state change period.

Now, the method to calculate the display value increase amount Ad will be described. In the present embodiment, the start timing of the display determination period Pd is midnight on a day which is 6 days before, counted excluding days on which the vehicle was not driven by the driver who is currently on the vehicle 10. The end timing of the display determination period Pd is the present time (namely, a point in time when the drive assistance ECU 20 displays the top screen 61 on the display 27).

FIG. 14 shows, in the form of a table, an example of the display value increase amounts Ad obtained on the basis of increase amounts in the state change values Sc. In the table of FIG. 14, the increase amounts of the state change value Sc due to operations by the driver who is currently on the vehicle 10 are shown for each day during a time period from 10 days ago to the present day.

As understood from a row Rw1 of the table in FIG. 14, the driver who is currently on the vehicle 10 did not drive the vehicle 10 two days ago and seven days ago. Therefore, the display determination period Pd of the present example is refers to a period of time from midnight eight days ago to the present time. Thus, each of the display value increase amounts Ad is the sum of the increase amounts of the state change value Sc related to that display value increase amount Ad from eight days ago to the present day.

It is assumed that the travel state of the vehicle 10 is the "highway" at the present time. In this case, the displayable candidate driving assistance functions are the driving assistance functions (No. 2, 4, and 6) which are surrounded by thick lines in FIG. 14.

As understood from FIG. 14, the display value increase amounts Ad (in the present example, "3") related to the lane tracing assist function and the display value increase amount Ad (in the present example, "4") related to radar cruise control function are equal to or greater than the increase amount threshold Ath (in the present embodiment, "3") respectively.

When the drive assistance ECU 20 displays the top screen 61 on the display 27, the drive assistance ECU 20 selects (extracts) two of the displayable candidate driving assistance functions whose display value increase amounts Ad are equal to or greater than the increase amount threshold Ath in descending order of the display value increase amount Ad. In addition, the drive assistance ECU 20 displays the display elements (namely, specific elements) related to the selected (extracted) displayable candidate driving assistance functions in the preferentially displayed element region 61a in descending order of the display value increase amount Ad. In other words, when the drive assistance ECU 20 displays the top screen 61 on the display 27, the drive assistance ECU 20 selects (extracts) the specific elements on the basis of the travel state of the vehicle 10 and the display value increase amount Ad, and displays the selected specific elements as the preferentially displayed elements. The condition employed when the drive assistance ECU 20 selects (extracts) the preferentially displayed elements from among the specific elements is also referred to as a "preferential display condition" for convenience' sake.

Reason for Extracting Preferentially Displayed Elements on the Basis of Display Value Increase Amount Ad Now, the reason for extracting preferentially displayed elements on the basis of the display value increase amounts Ad (namely, increase amounts of the state change values Sc) will be described. The driver may perform operation of setting change without an intention to change the set state (namely, setting procedure checking operation) in order to confirm the procedure to change the set state (or in order to confirm how to change the set state).

Presumably, the setting procedure checking operation is an operation to switch a set state from a "first state" to a "second state" and to switch back the set state from the second state to the first state in a relatively short time. Therefore, in the example shown in FIG. 13, the setting operation performed during the first setting change period can be regarded (considered) as the setting procedure checking operation. When such kind of operation is performed, the drive assistance ECU 20 regards that operation as the setting procedure checking operation so as not to increase the state change value Sc (thereby preventing the state change value Sc from increasing (changing)).

In contrast, when the driver performed a setting operation with intention to actually change the set state, the set state after that setting operation (or the change in the set state) tends to continue for a period longer than the reference time Tc without another operation for changing the set state back again. Therefore, the drive assistance ECU 20 does not regards the setting operation performed during the second setting change period shown in FIG. 13 as the setting procedure checking operation, thereby increasing the state change value Sc.

Consequently, the state change value Sc related to the driving assistance function whose set state is actually changed frequently becomes larger, and thus, the display value increase amount Ad becomes larger. Therefore, the display value increase amount Ad for a pair (set) of a certain driver and a certain driving assistance function indicates the frequency of changing the set state of the certain driving assistance function by the certain driver (namely, the estimated number of times of changing the set state in actuality during a particular period).

Therefore, there is a high possibility that the set state of the driving assistance functions related to the preferentially displayed element selected on the basis of the display value increase amount Ad is actually changed by the driver who is currently on the vehicle 10 with a relatively high frequency. Accordingly, there is a high possibility that the driver can easily change the desired set state by selecting (using) the preferentially displayed element.

Specific Operation

Next, specific operation of the drive assistance ECU 20 will be described with reference to FIG. 15 and FIG. 16. The CPU of the drive assistance ECU 20 (hereinafter also referred to as "the CPU" for simplification) executes a "state change value increase processing routine" represented by a flowchart shown in FIG. 15 every time a predetermined time elapses while it is in operation. In addition, the CPU also executes the state change value increase processing routine when the OFF operation to the ignition switch is performed.

Figure 15:
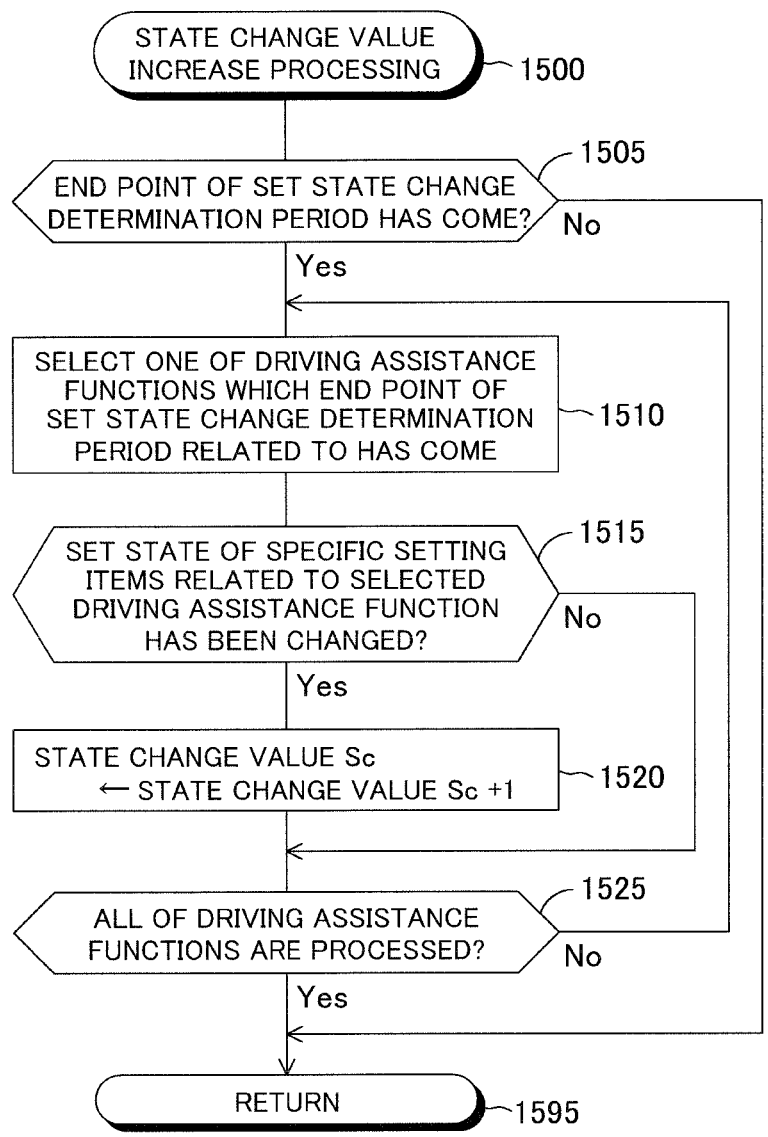
FIG. 15 is a flowchart representing a state change value increase processing routine executed by the present assisting apparatus.
Figure 16:
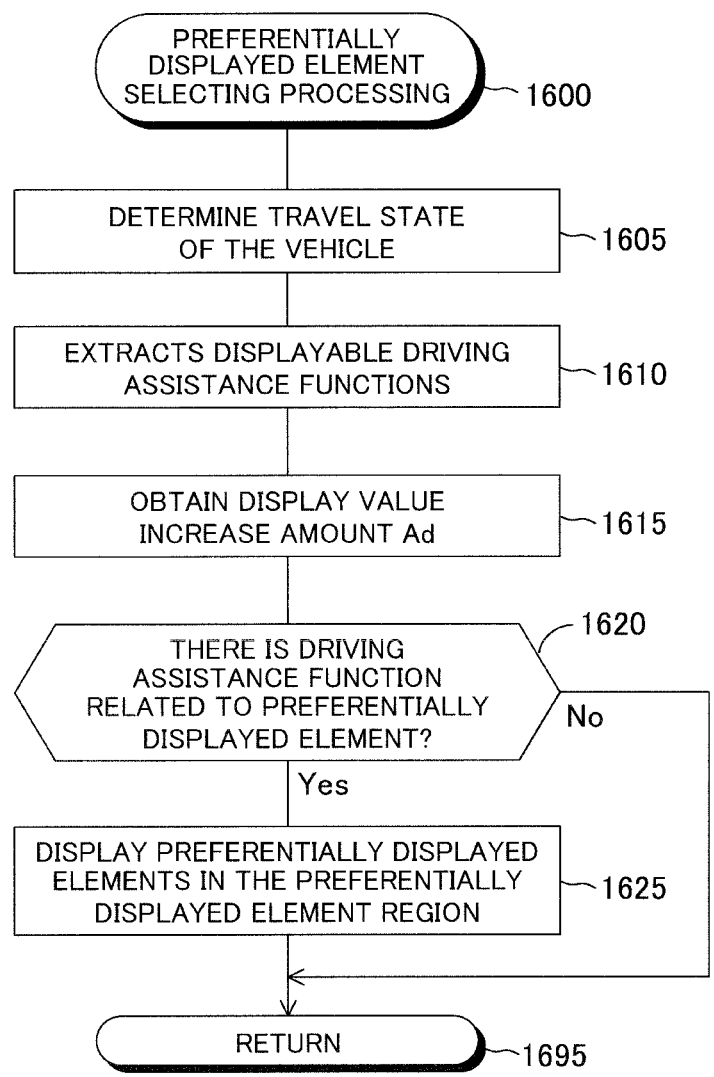
FIG. 16 is a flowchart representing a preferentially displayed element selecting processing routine executed by the present assisting apparatus.

Therefore, when an appropriate timing has come, the CPU starts the process from step 1500 of FIG. 15 and proceeds to step 1505 so as to determine whether or not there is a driving assistance function corresponding to the set state change determination period whose end point in time has come. In other words, the CPU determines whether or not there is a set state change determination period related to a specific element (namely, a specific element related to one of the driving assistance functions) whose end point in time is included in a period of time from a point in time when the present routine was executed last time to the present time.

If there is a driving assistance function corresponding to the set state change determination period whose end point in time has come, the CPU makes a "Yes" determination in step 1505 and proceeds to step 1510 so as to select one of the driving assistance function(s) which corresponds to the set state change determination period whose end point in time has come. Subsequently, the CPU proceeds to step 1515 so as to determine whether or not the set state of the specific setting item(s) related to the selected driving assistance function has been changed since the start point in time of the set state change determination period.

If the set state of the specific setting item(s) differ between the start point in time and the end point in time of the set state change determination period, the CPU makes a "Yes" determination in step 1515 and proceeds to step 1520 so as to increase the state change value Sc related to a pair (set) of the selected driving assistance function and the specified driver (namely, the driver who is currently on the vehicle 10) of the vehicle 10 by "1." Subsequently, the CPU proceeds to step 1525.

Meanwhile, if the set states do not differ between the start point in time and the end point in time of the set state change determination period, the CPU makes a "No" determination in step 1515 and proceeds to step 1525 directly. Namely, the state change value Sc is not varied in this case.

In step 1525, the CPU determines whether or not the processing described above has been executed for all of the driving assistance function(s) each corresponding to the set state change determination period whose end point in time has come. If there is a driving assistance function for which the processing described above has not been executed, the CPU makes a "No" determination in step 1525 and proceeds to step 1510 so as to select the other one of the driving assistance function(s) for which the processing described above has not been executed.

Meanwhile, the processing described above has been executed for all of the driving assistance function(s), each corresponding to the set state change determination period whose end point in time has come, the CPU makes a "Yes" determination in step 1525 and proceeds to step 1595 so as to end the present routine. Notably, in a case where the determination condition of step 1505 is not satisfied (namely, there is no driving assistance function corresponding to the set state change determination period whose end point in time has come), the CPU makes a "No" determination in step 1505 and proceeds to step 1595 directly.

Next, a "preferentially displayed element selecting processing routine" represented by a flowchart shown in FIG. 16 will be described. When the CPU displays the top screen 61 on the display 27, the CPU executes the preferentially displayed element selecting processing routine so as to select (extract) the driving assistance functions related to the preferentially displayed elements.

When an appropriate timing has come, the CPU starts the process from step 1600 of FIG. 16 and executes processes of steps from step 1605 to step 1615 described below in sequence, and then proceeds to step 1620.

Step 1605: the CPU determines which one from among the "highway," the "parking" and the "others" corresponds to the travel state of the vehicle 10 at the present time.

Step 1610: the CPU extracts displayable candidate driving assistance functions on the basis of the travel state of the vehicle 10.

Step 1615: the CPU obtains (figures out) the display value increase amount Ad related to a pair (set) of the driver who is currently on the vehicle 10 and one of the displayable candidate driving assistance functions for each of the displayable candidate driving assistance functions, respectively. More specifically, the CPU obtains, as the display value increase amount Ad of a driving assistance function related to a certain state change value Sc, the difference between the value of the certain state change value Sc at the end point in time of the display determination period Pd (namely, the present point in time) and the value of the certain state change value Sc at the start point in time of the display determination period Pd.

In step 1620, the CPU determines whether or not there is a driving assistance function related to a preferentially displayed element (namely, whether or not there is a driving assistance function whose display value increase amount Ad is greater than or equal to the increase amount threshold Ath).

If there is a driving assistance function related to a preferentially displayed element, the CPU makes a "Yes" determination in step 1620 and proceeds to step 1625 so as to display up to two preferentially displayed elements in descending order of the display value increase amount Ad in the preferentially displayed element region 61a on the display 27. Subsequently, the CPU proceeds to step 1695 so as to end the present routine.

Meanwhile, there is no driving assistance functions related to a preferentially displayed element, the CPU makes a "No" determination in step 1620 and proceeds to 1695 directly. Namely, in this case, no preferentially displayed elements are displayed in the preferentially displayed element region 61a.

As having been described above, the drive assistance ECU 20 selects (determines) preferentially displayed elements on the basis of the travel state of the vehicle 10 and the frequency of changing the set state by the driver who is currently on the vehicle 10 (namely, the display value increase amount Ad). In addition, increasing of the display value increase amount Ad due to the setting procedure checking operation can be avoided to a possible extent. Therefore, according to the present assisting apparatus, the display element (specifically, the specific element) relating to a driving assistance function whose set state the driver who is currently on the vehicle 10 wants to change is more likely to be selected as the preferentially displayed element, and is displayed in the preferentially displayed element region 61a. Therefore, the driver of the vehicle 10 can easily change "the set state related to the drive assistance function" which the driver desires to change, without passing through the various setting screen 62 and the vehicle setting screen 63.

The embodiment of the changing operation assisting apparatus according to the present disclosure has been described; however, the present disclosure is not limited to the above-described embodiment, and various modifications are possible without departing from the scope of the disclosure. For example, the drive assistance ECU 20 may obtain target information by using an apparatus other than the millimeter wave radars 22 (for example, an ultrasonic sonar apparatus and a LIDAR apparatus (Light Detection And Ranging)).

In addition, in the present embodiment, the selection switch 56 and the OK switch 57 provided (mounted) on the steering wheel 55 are used for the operation section. However, the operation section may have a different configuration from switches mounted on the steering wheel 55. For example, the operation section may be configured by a touch panel disposed on the display 27. In this case, the driver selects a selection element by touching a button (namely, the selection element) displayed on the display 27. Further, in this case, the display 27 outputs information (a signal) which is used for specifying the selected button to the drive assistance ECU 20.

In addition, in the present embodiment, the drive assistance ECU 20 specifies the driver who is currently on the vehicle 10 on the basis of which of the button 79a to the button 79e contained in the driver selection screen 66 is selected. However, the drive assistance ECU 20 may specify the driver who is currently on the vehicle 10 by a method different from that of the present embodiment. For example, the drive assistance ECU 20 may specify the driver who is currently on the vehicle 10 on the basis of an ignition key used for the ON operation to the ignition switch (in this case, an ignition key switch of the vehicle 10). In this case, each of the drivers of the vehicle 10 has a different (unique) ignition key.

In addition, in the present embodiment, when the set state is changed, the drive assistance ECU 20 increases the state change value Sc by "1" regardless of the type of the set state change determination period (namely, regardless of any of the travel start period, the travel end period and the setting change period). However, increase amount of the state change value Sc may differ according to the type of the set state change determination period. For example, when the set state is changed during the setting change period, the drive assistance ECU 20 may increase the state change value Sc by "2."

In addition, in the present embodiment, the set state change determination period consists of the travel start period, the travel end period and the setting change period. However, the set state change determination period may be different from that of the present embodiment. For example, the set state change determination period may include only the setting change period. In this case, the travel start period and the travel end period are both excluded from the set state change determination period.

In addition, in the present embodiment, the drive assistance ECU 20 displays up to two preferentially displayed elements in the preferentially displayed element region 61a. However, the number of the preferentially displayed elements contained (included) in the preferentially displayed element region 61a may be different from that of the present embodiment. For example, the drive assistance ECU 20 may display, in the preferentially displayed element region 61a, all of the preferentially displayed elements related to the drive assistance functions whose the display value increase amounts Ad are equal to or greater than the increase amount threshold Ath.

In addition, in the present embodiment, the increase amount threshold Ath is "3." However, the increase amount threshold Ath may be different from that of the present embodiment. For example, the increase amount threshold Ath may be "1", "2", or "4".

In addition, in the present embodiment, the start timing of the display determination period Pd is midnight on a day which is 6 days before, counted excluding days on which the vehicle was not driven by the driver who is currently on the vehicle 10 at the present time. However, the start timing of the display determination period Pd may be different from that of the present embodiment. For example, the start timing of the display determination period Pd may be the same time as the present time (current time) on a day which is 7 days before, counted excluding days on which the vehicle was not driven by the driver who is currently on the vehicle 10 at the present time. Alternatively, the start timing of the display determination period Pd may be determined on the basis of an integrated value (total value) of a time period during which the driver who is currently on the vehicle 10 has driven the vehicle 10.

In addition, in the present embodiment, the preferentially displayed element region 61a is contained in the top screen 61. However, the screen which contains the preferentially displayed element region 61a may be different from that of the present embodiment. For example, the preferentially displayed element region 61a may be displayed on the display 27 as a part of the various setting screen 62. Even in this case, the driver can easily change the set state without displaying a setting screen for the desired setting change via the vehicle setting screen 63.

In addition, in the present embodiment, the drive assistance ECU 20 determines the travel state of the vehicle 10 by applying the present position Pn obtained by the GPS receiving section 25 to the map information of the map database 26. However, the drive assistance ECU 20 may determine the travel state of the vehicle 10 by a method different from that of the present embodiment. For example, the drive assistance ECU 20 may determine that the travel state of the vehicle 10 is the "highway," when a state where the vehicle speed Vs is greater than a predetermined first speed threshold continues. Further, the drive assistance ECU 20 may determine that the travel state of the vehicle 10 is the "parking," when a state where the vehicle speed Vs is less than a predetermined second speed threshold continues.

In addition, in the present embodiment, the setting elements are buttons which are associated with the setting items (set states). However, the setting elements may be display elements other than the buttons. For example, the setting elements are displayed on the display 27 as check boxes or radio buttons.

What is claimed is:

1. A changing operation assisting apparatus comprising:
 a display section which is disposed in a vehicle and configured to be capable of displaying various screens, said screens including, as selection elements, display elements which include setting elements and transition elements, each of said setting elements being said selection element which has been related to a setting item relating to a driving assistance function provided by said vehicle in advance and is selected so as to change a set state of said setting item, each of said transition elements being said selection element which has been related to a different one of said screens in advance and is selected for displaying said different one of said screens through screen transition;
 an operation section which is used by a driver of said vehicle for an operation of selecting one of said selection elements contained in said screen displayed on said display section and is configured to be capable of outputting information regarding said operation of selecting, and
 a control section which is implemented by at least one programmed processor and is configured to control said screens selectively displayed on said display section and change said set state relating to said driving assistance function on the basis of said information regarding said operation of selecting output from said operation section;
wherein,
 said control section includes a driver specifying section, a state change value processing section, and a preferentially displayed element display section,
 said driver specifying section specifying a driver who is currently on said vehicle,
 said state change value processing section being configured to increase a state change value corresponding to a combination of said specified driver and a specific element among said selection elements, if a set state of a specific setting item corresponding to said specific element has been changed in a period between start and end points of a setting change determination period corresponding to said specific element,
 said preferentially displayed element display section being configured, when displaying a predetermined specific screen among said screens on said display section, to display, as a preferentially displayed element, said specific element satisfying a predetermined preferential display condition as a portion of said specific screen on said display section,
 in a case where said specific element is said setting element, said specific setting item being said setting item related to said specific element,
 in a case where said specific element is said transition element, said specific setting item being said setting item related to said setting element contained in one of said screens which is displayed through screen transition as a result of selection of said specific element, and
 said preferential display condition including a condition which is satisfied when a display value increase amount is equal to or greater than a predetermined increase amount threshold, said display value increase amount being an increase amount of said state change value corresponding to the combination of said specified driver and said specific element within a predetermined display determination period, wherein
 said setting change determination period includes a setting change period,
 said setting change period is such that:
 in a case where, before the start point of said setting change period relating to said state change value comes, the set state of said setting item relating to that state change value is changed, the point in time when that set state is changed becomes the start point of that setting change period;
 in a case where a state in which the set state of said setting item relating to that state change value is not changed has continued for a period of time longer than a predetermined reference time which is shorter than said display determination period, a point in time when that set state was changed latest becomes the end point of that setting change period; and
 in a case where the set state of said setting item relating to that state change value is changed after the end point of that setting change period, the end point of that setting change period becomes the start point of said setting change period newly starting.

2. The changing operation assisting apparatus according to claim 1, wherein said setting change determination period includes at least one of a period from a point in time when operation of said control section is started by said specified driver to a point in time when travel of said vehicle is started for the first time, and a period from a point in time when the last travel of said vehicle is ended before the operation of said control section is stopped by said specified driver to a point in time when said control section ends its operation.

3. The changing operation assisting apparatus according to claim 1, wherein said control section includes a travel state determination section which determines which one of predetermined travel state patterns corresponds to a travel state of said vehicle, and said preferential display condition includes a condition which is satisfied when said specific element is related to said travel state pattern corresponding to the travel state of said vehicle.

4. The changing operation assisting apparatus according to claim 1, wherein said preferentially displayed element display section displays a predetermined number of said preferentially displayed elements in said specific screen in a descending order determined on the basis of the display value increase amount relating to the specified driver.

5. The changing operation assisting apparatus according to claim 1, wherein said specific screen is a screen such that the number of screen transitions necessary for said specified driver to display said screen related to said transition element which is said preferentially displayed element becomes smaller in a case where said specified driver selects said transition element displayed in said specific screen, as compared with a case where said specified driver does not select said transition element displayed in said specific screen.

6. A changing operation assisting apparatus comprising:
a display section which is disposed in a vehicle and configured to be capable of displaying various screens, said screens including, as selection elements, display elements which include setting elements and transition elements, each of said setting elements being said selection element which has been related to a setting item relating to a driving assistance function provided by said vehicle in advance and is selected so as to change a set state of said setting item, each of said transition elements being said selection element which has been related to a different one of said screens in advance and is selected for displaying said different one of said screens through screen transition;
an operation section which is used by a driver of said vehicle for an operation of selecting one of said selection elements contained in said screen displayed on said display section and is configured to be capable of outputting information regarding said operation of selecting, and
a control section which is implemented by at least one programmed processor and is configured to control said screens selectively displayed on said display section and change said set state relating to said driving assistance function on the basis of said information regarding said operation of selecting output from said operation section;
wherein,
said control section includes a driver specifying section, a state change value processing section, and a preferentially displayed element display section, said driver specifying section specifying a driver who is currently on said vehicle, said state change value processing section being configured to increase a state change value corresponding to a combination of said specified driver and a specific element among said selection elements, if a set state of a specific setting item corresponding to said specific element has been changed in a period between start and end points of a setting change determination period corresponding to said specific element, said preferentially displayed element display section being configured, when displaying a predetermined specific screen among said screens on said display section, to display, as a preferentially displayed element, said specific element satisfying a predetermined preferential display condition as a portion of said specific screen on said display section, in a case where said specific element is said setting element, said specific setting item being said setting item related to said specific element, in a case where said specific element is said transition element, said specific setting item being said setting item related to said setting element contained in one of said screens which is displayed through screen transition as a result of selection of said specific element, and said preferential display condition including a condition which is satisfied when a display value increase amount is equal to or greater than a predetermined increase amount threshold, said display value increase amount being an increase amount of said state change value corresponding to the combination of said specified driver and said specific element within a predetermined display determination period, wherein the start point of said display determination period is a predetermined time on a day which is a predetermined number of days before, counted excluding days on which said vehicle was not driven by said specified driver, and the end point of said display determination period is a point in time when said specific screen is displayed on said display section.

7. The changing operation assisting apparatus according to claim 6, wherein said setting change determination period includes at least one of a period from a point in time when operation of said control section is started by said specified driver to a point in time when travel of said vehicle is started for the first time, and a period from a point in time when the last travel of said vehicle is ended before the operation of said control section is stopped by said specified driver to a point in time when said control section ends its operation.

8. The changing operation assisting apparatus according to claim 6, wherein said control section includes a travel state determination section which determines which one of predetermined travel state patterns corresponds to a travel state of said vehicle, and said preferential display condition includes a condition which is satisfied when said specific element is related to said travel state pattern corresponding to the travel state of said vehicle.

9. The changing operation assisting apparatus according to claim 6, wherein said preferentially displayed element display section displays a predetermined number of said preferentially displayed elements in said specific screen in a descending order determined on the basis of the display value increase amount relating to the specified driver.

10. The changing operation assisting apparatus according to claim 6, wherein said specific screen is a screen such that the number of screen transitions necessary for said specified driver to display said screen related to said transition element which is said preferentially displayed element becomes smaller in a case where said specified driver selects said transition element displayed in said specific screen, as compared with a case where said specified driver does not select said transition element displayed in said specific screen.

* * * * *